United States Patent
Tanase et al.

(10) Patent No.: US 6,783,152 B2
(45) Date of Patent: Aug. 31, 2004

(54) HEAD PROTECTING AIRBAG DEVICE

(75) Inventors: Toshinori Tanase, Aichi-ken (JP); Katsunobu Sakane, Aichi-ken (JP); Chiharu Totani, Aichi-ken (JP); Shinji Oguchi, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 91 days.

(21) Appl. No.: 10/134,706

(22) Filed: Apr. 30, 2002

(65) Prior Publication Data

US 2002/0175504 A1 Nov. 28, 2002

(30) Foreign Application Priority Data

May 23, 2001 (JP) ........................................ 2001-153847
Aug. 3, 2001 (JP) ........................................ 2001-235974

(51) Int. Cl.[7] ........................ B60R 21/16; B60R 21/20; B60R 21/22
(52) U.S. Cl. ................ 280/730.1; 280/730.2; 280/743.2
(58) Field of Search .................... 280/730.1, 730.2, 280/743.2

(56) References Cited

U.S. PATENT DOCUMENTS

2003/0111828 A1 * 6/2003 Dominissini ............. 280/730.2

FOREIGN PATENT DOCUMENTS

| DE | 199 37 678 A1 | * 6/2003 |
| JP | 9249089 | 9/1997 |
| JP | 2000-272460 | 10/2000 |

* cited by examiner

*Primary Examiner*—Ruth Ilan
(74) *Attorney, Agent, or Firm*—Posz & Bethards, PLC

(57) ABSTRACT

A passenger's seat airbag device is mounted on a vehicle in which a rear wall portion is arranged on the rear side of a side window. The airbag is folded and housed on the upper edge side of the side window to cover the side window. The airbag is mounted on its two longitudinal ends. The rear side leading end is mounted on the rear wall portion. In the vicinity of the corner portion a guide guides the downward protrusion of the airbag and can regulate the movement of the airbag to the interior side when the airbag is extending and expanding.

7 Claims, 26 Drawing Sheets

HEAD PROTECTING AIRBAG DEVICE

The present application claims priority to Japanese patent application of Sakane et alt., filed May 23, 2001, No. 2001-153847, and Japanese patent application of Tanase et al., filed Aug. 3, 2001, No. 2001-235974, the entirety of each is hereby incorporated into the present application by this reference.

BACKGROUND OF THE INVENTION

1. Field of the Invention

The present invention relates to a head protecting airbag device provided with an airbag which is so folded and housed on the upper edge side of a side window as to cover a side window positioned on the side face of a vehicle when the airbag is extending and expanding.

2. Description of Related Art

A head protecting airbag device of the prior art has an airbag which is so folded and housed on the upper edge side of a side window positioned on the side face of a vehicle as to cover the side window when the airbag is extending and expanding (as referred to Unexamined Published Japanese Patent Application No. 2000-272460).

Moreover, the airbag is constructed to cover the side window when the airbag is extending and expanding and to apply a longitudinal tension to the airbag when the airbag is extending and expanding. Specifically, the front side leading end of the airbag is mounted on the front pillar portion of the vehicle body. And, the rear side leading end of the airbag is mounted on the upper edge side of the side window on the vehicle side face and backward apart from the portion of the airbag covering the side window to the lower side.

In the airbag described in the Japanese Patent Application, the longitudinal tension is so developed when the airbag is extending and expanding as to join the portions mounted on the vehicle body at the front side leading end and the rear side leading end.

Here, the reason why the longitudinal tension is developed in the airbag is to suppress the movement of the airbag to the exterior side even if the airbag receives a pushing force to the exterior side.

In case the vehicle having the airbag device mounted thereon is a single-cab vehicle such as a motor truck or a double-cab vehicle, however, the side of the side window toward the rear is a rear wall portion such as a rear panel perpendicularly intersecting the side window.

In this vehicle, moreover, the portion of the airbag covering the side window as far as the lower side is so close to the rear wall portion that there is no space for mounting the rear side end of the airbag. As a result, it is hard to mount the airbag on a vehicle such as the single-cab vehicle which develops the longitudinal tension upon completion of the extension and expansion.

As another head protecting airbag device of the prior art, there is a construction which is disclosed in Unexamined Published Japanese Patent Application No. 9-249089.

This head protecting airbag device comprises guide means for guiding the end portion of the airbag downward when the airbag is extending and expanding which is folded and housed on the upper edge side of the window. This guide means is arranged along the center pillar portion to guide the rear end portion of the airbag downward along the center pillar portion.

However, the head protecting airbag device thus constructed has a disadvantage when it is applied to the airbag which develops the longitudinal tension on the lower edge side upon completion of the extension and expansion. If the tension occurs in advance on the lower edge side of the airbag, the lower edge of the airbag does not smoothly move downward along the guide means and thus the airbag expands insufficiently.

SUMMARY OF THE INVENTION

A first object of the invention is to provide a head protecting airbag device which can develop a longitudinal tension easily in an airbag having completed its extension and expansion, even when it is mounted on a vehicle such as a single-cab vehicle having a rear wall portion arranged to intersect a side window generally perpendicularly on the side of the side window toward the rear to be covered with the airbag.

A second object of the invention is to provide a head protecting airbag device, in which an airbag can complete its extension while being smoothly guided by guide means even if the airbag is constructed to develop a longitudinal tension on the lower edge side upon completion of the extension and expansion.

The first object of the invention can be achieved by a head protecting airbag device to be mounted on a vehicle including: a side window positioned on the side face of the vehicle; a rear wall portion arranged on the side of the side window toward the rear; and a pillar portion arranged on the side of the side window toward the front, wherein the rear wall portion is arranged to intersect the side window generally perpendicularly, and wherein the pillar portion is arranged to extend generally vertically, comprising:

an airbag folded and housed on the upper edge of the side window on the interior side so that it can cover the side window when extending and expanding, wherein the airbag is mounted at its two longitudinal ends on the vehicle body so that it may develop a longitudinal tension when the airbag is extending and expanding, wherein the airbag is mounted at its front end on the pillar portion, and wherein the airbag is mounted at its rear end at a position of the rear wall portion removed from the vehicle side face; and guide means arranged near the corner portion between the rear wall portion and the vehicle side face so as to guide the downward protrusion of the airbag when the airbag is extending and expanding and to regulate the movement of the airbag at the corner portion toward the interior side upon completion of the extension and expansion.

At the operating time of the head protecting airbag device thus constructed, the airbag folded on the upper edge of the side window positioned on the vehicle side face extends and expands downward to cover the side window.

This airbag protrudes downward from the upper edge side of the side window in the vicinity of the corner portion while being guided by the guide means. And, the airbag completes its extension and expansion while its movement to the interior side is regulated by the guide means.

At this time, the airbag is mounted at its front end on the pillar portion on the side of the side window toward the front. Moreover, the rear end is mounted at a position of the rear wall portion apart from the vehicle side face. And, the airbag is not loosened even it is bent to the interior side in the vicinity of the corner portion, because its movement to the interior side is regulated by the guide means.

As a result, the longitudinal tension can be developed in the airbag upon completion of the extension and expansion without any trouble between the front end and the rear end.

Even if the head protecting airbag device according to the invention is mounted on a vehicle such as a single-cab vehicle in which the rear wall portion is so arranged on the side of the side window toward the rear to be covered with the airbag so as to intersect the side window generally perpendicularly, therefore, the longitudinal tension can be easily developed in the airbag having completed the extension and expansion.

In the head protecting airbag device, moreover, it is preferable that the airbag includes at least one vertical expansion portion for expanding vertically by admitting an inflating gas when the airbag is extending and expanding.

With this construction of the head protecting airbag device, when the airbag is extending and expanding the vertical expansion portion can expand to shrink the airbag longitudinally by admitting the inflating gas. Therefore, a higher longitudinal tension can be developed in the airbag having completed its expansion.

In the head protecting airbag device thus constructed, moreover, it is preferable that upon completion of the expansion the vertical expansion portion in the vicinity of the guide means is arranged along the guide means, and that the airbag is so mounted on the rear wall portion as to extend generally linearly from and in the direction of the lower edge of the vertical expansion portion.

With the head protecting airbag device thus constructed, the vertical expansion portion exhibits a rigidity to some extent when it is charged with the inflating gas. Upon completion of the expansion of the airbag, moreover, the vertical expansion portion is pulled near its lower edge toward the rear of the vehicle. In other words, the vertical expansion portion turns its lower end pivoting on its upper end so that the higher longitudinal tension is developed at the lower edge side of the airbag.

Moreover, it is preferable that the portion of the airbag to be arranged facing the side of the guide means toward the exterior of the car when the airbag is extending and expanding is constructed of a non-inlet portion for admitting no inflating gas.

With the head protecting airbag device thus constructed, the guide means can be arranged very close to the exterior side to retain more space in the interior side.

In the head protecting airbag device thus constructed, moreover, it is preferable that the guide means is formed of a guide fixture made of a long metal member and includes a guide regulating portion extending vertically and a joint portion to be jointed to the car body, that the guide regulating portion can guide and regulate the movement of the airbag, and that the joint portion is arranged on either the upper or lower side of the guide regulating portion or both.

Moreover, the guide means may properly be formed of a band-shaped belt having flexibility and includes a guide regulating portion extending vertically and joint portions joining the guide to the car body so that the guide regulating portion can guide and regulate the movement of the airbag, and that the joint portions are arranged on the upper and lower ends of the guide regulating portion.

Moreover, the guide means may be mounted on a passenger seating seat arranged on the vehicle body.

In case the guide means is exemplified by a guide fixture made of a long metal member and including a guide regulating portion and a joint portion, a band-shaped belt having a flexibility or a passenger seating seat arranged in the vehicle body, it is easily possible to guide the portion of the airbag near the corner to regulate its movement toward the interior.

On the other hand, a second object of the invention can be achieved by a head protecting airbag device comprising:

an airbag folded and housed on the upper edge of a side window on the interior side of a vehicle; an inflator for feeding an inflating gas to the airbag; guide means mounted on the vehicle body; and engaging means arranged in the airbag for engaging with the guide means, wherein the airbag extends and expands downward from the upper edge side of the side window, when the inflating gas flows in, to cover the interior side of the side window, wherein the guide means is so vertically arranged as to guide the downward extension of the airbag, wherein the guide-engaging portion can be guided by the guide means when the airbag is extending and expanding, and wherein the airbag includes an initial vertical expansion portion arranged to expand along the guide means for moving the guide-engaging portion downward along the guide means at the beginning of the inflow of the inflating gas.

When the airbag in the head protecting airbag device thus constructed accepts the inflating gas from the inflator, the initial vertical expansion portion expands first of all. In accordance with the expansion of the initial vertical expansion portion, moreover, the guide-engaging portion moves downward while being guided by the guide means so that it is arranged at a predetermined expansion completion position of the airbag. Before the remaining portions of the airbag receive the inflating gas to develop the tension on the lower edge side of the airbag, the guide-engaging portion is guided in advance by the guide means to complete the extension of the airbag substantially. Therefore, the airbag can complete its extension and expansion without any trouble and also can develop longitudinal tension on the lower edge.

In the head protecting airbag device according to the invention, therefore, the airbag can be smoothly guided by the guide means to complete its extension, even if it is constructed to develop longitudinal tension on the lower edge upon completion of the extension and expansion.

In the head protecting airbag device thus constructed, it is preferable that the guide means is covered on its interior-facing side with an edge portion of the interior surface of the vehicle, which can open toward the interior side.

With the head protecting airbag device thus constructed, when the airbag does not extend, the guide means is covered on its interior side with the interior finish constructed of a pillar garnish or trim. Therefore, the decorative design of the vehicle having the guide means mounted thereon is improved. When the airbag is extending and expanding, the edge portion of the interior surface covering the interior-facing side of the guide means opens to the interior side so that it does not obstruct the extension and expansion of the airbag.

In the head protecting airbag device thus constructed, moreover, it is preferable that the guide means has a flexibility and is arranged to open and protrude the edge portion of the interior finish from the housed position of the guide means toward the interior side when the airbag is extending and expanding thereby to prevent the interference between airbag and the interior finish.

With the head protecting airbag device thus constructed, when the airbag is extending and expanding, the flexible guide means opens the edge portion of the interior finish and protrudes from the housed position toward the interior. Therefore, the airbag can extend and expand smoothly without its guide-engaging portion interfering with the interior finish.

In the head protecting airbag device thus constructed, still moreover, it is preferable that the airbag includes a plurality of vertical expansion portions for expanding vertically by admitting the inflating gas.

With the head protecting airbag device thus constructed, when the airbag is extending and expanding, each vertical expansion portion expands in such a way that the airbag shrinks longitudinally by admitting the inflating gas. After the airbag has completed its expansion, therefore, it is possible to develop a high longitudinal tension.

In the head protecting airbag device thus constructed, still moreover, it is preferable that the initial vertical expansion portion is arranged close to the inflator and upstream of the inflating gas.

With the head protecting airbag device thus constructed, when the airbag is extending and expanding, the inflating gas discharged from the inflator can be promptly introduced into the initial vertical expansion portion. In other words, this initial vertical expansion portion can expand earlier than the remaining portions of the airbag. As a result, the guide-engaging portion can promptly move downward while being guided by the guide member to extend the airbag promptly.

DESCRIPTION OF THE PREFERRED EMBODIMENTS

Figure 1:
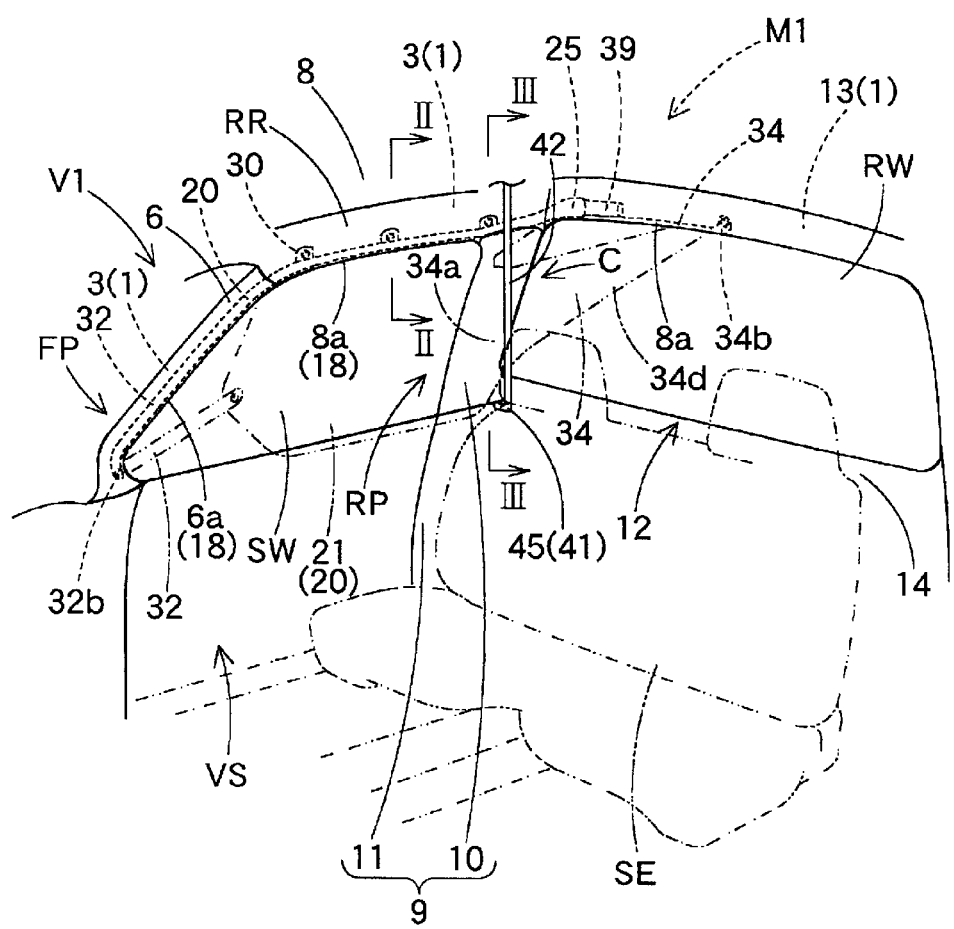
FIG. 1 is a perspective view showing a used mode of a head protecting airbag device of a first embodiment according to the present invention, from the interior side of a vehicle.

The invention will be described below by way of embodiments shown in the drawings. In addition, the invention is not limited to the embodiments. All modifications within the requirements of the claims and equivalents with respect to the requirements should be included in the scope of the claims.

Embodiments of the invention will be described with reference to the accompanying drawings.

First of all, here will be described head protecting airbag devices M1 to M4 for achieving the first object of the invention.

The head protecting airbag device M1 of the first embodiment shown in FIGS. 1 to 6 is mounted on a single-cab vehicle V1. The head protecting airbag device M1 comprises an airbag 20, an inflator 39, guide means 41 and an airbag cover 18.

Here, the single-cab vehicle V1 is provided with a side window SW, a rear wall portion 12 and a front pillar portion FP. The side window SW is arranged on the side of a seat SE, on which a passenger is seated, and is positioned on a vehicle side face VS. The rear wall portion 12 is so arranged at the back of the side window SW as to intersect the side window SW generally perpendicularly. The front pillar portion FP is positioned on the front side of the side window SW, which extends obliquely downward from a roof side rail portion RR. Moreover, the front pillar portion FP is generally vertically arranged. Moreover, this vehicle V1 has a rear pillar portion RP arranged to extend vertically. The rear pillar portion RP is arranged on the vehicle side face VS side in the vicinity of corner portion C, at which the rear wall portion 12 and the vehicle side face VS intersect.

The front pillar portion FP and the rear pillar portion RP are individually provided with an inner panel 3 made of a sheet metal on the vehicle body (or body 1) side, and pillar garnishes 6 and 9 made of a synthetic resin covering the interior sides of the pillar portions FP and RP. Here, the body 1 is provided with the inner panel 3 on the interior side and an outer panel 2 made of a sheet metal on the exterior side (as referred to FIG. 3). The body 1 has not-shown reinforcements or the like arranged at predetermined portions for enhancing the rigidity.

Figure 3:
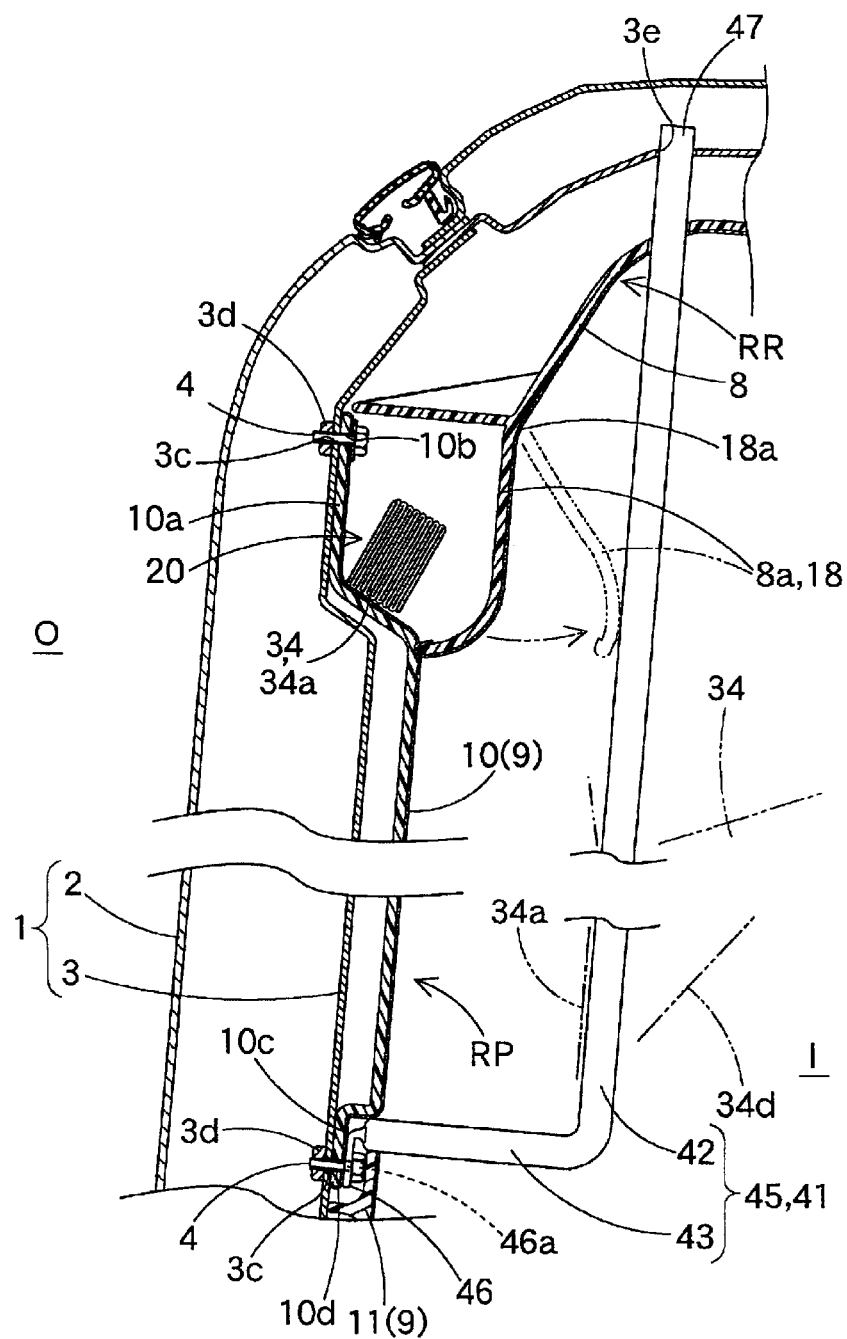
FIG. 3 is a vertical section of a portion III—III of FIG. 1.

In the embodiment, moreover, the rear pillar garnish 9 is provided with an upper side upper panel 10 and a lower side lower panel 11. The two upper and lower edges of the upper panel 10 are mounting portions 10a and 10c. In these mounting portions 10a and 10c, respectively, there are formed mounting holes 10b and 10d for mounting the portions 10a and 10c on the inner panel 3, as shown in FIG. 3. The individual mounting portions 10a and 10c are mounted on the inner panel 3 by fastening bolts 4 through the mounting holes 10b and 10d into nuts 3d fixed on the circumferential edges of mounting holes 3c of the inner panel 3.

Figure 2:
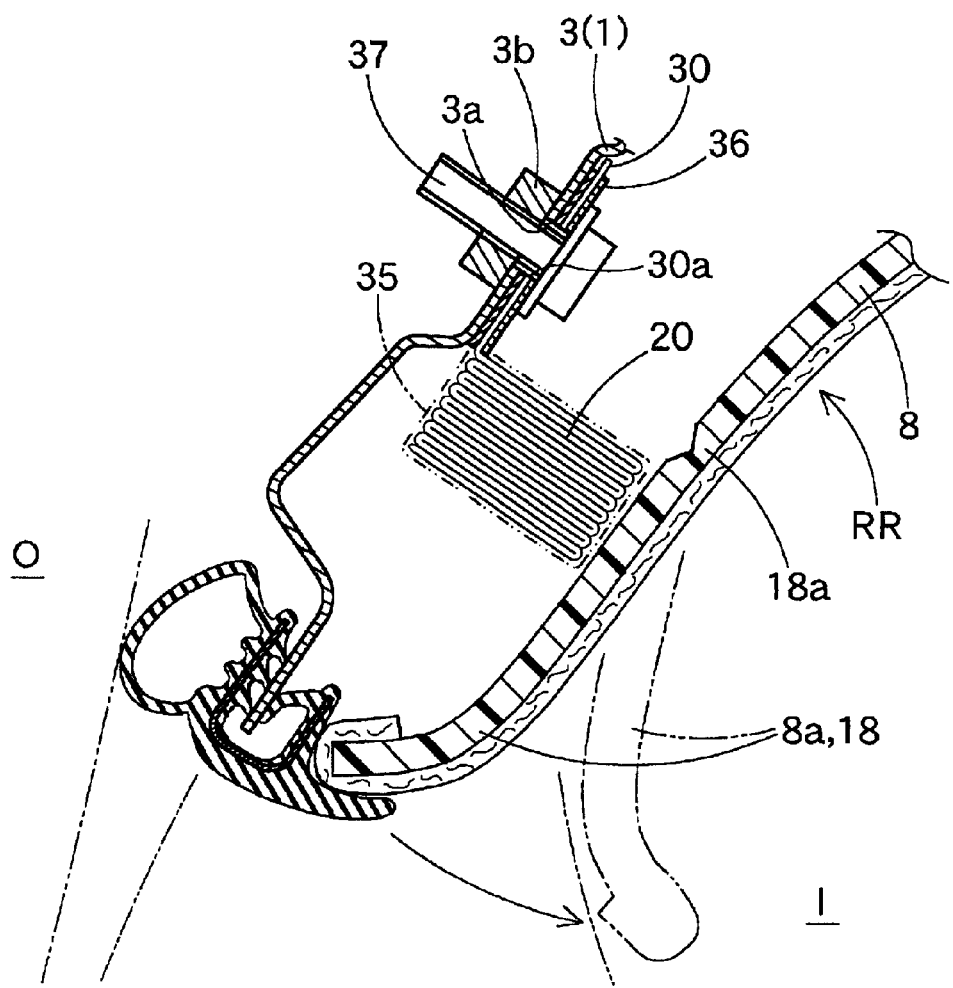
FIG. 2 is a vertical section of a portion II—II of FIG. 1.

In the roof side rail portion RR, moreover, the inner panel 3 is covered on the interior side I with a roof head lining 8 made of a synthetic resin, as shown in FIG. 2.

The rear wall portion 12 has a rear window RW arranged at its center, as shown in FIG. 1. Moreover, the rear wall portion 12 is provided with a rear panel 13 made of a sheet metal on the vehicle body (or the body 1) side, and a rear trim 14 made of a synthetic resin covering the interior side of the rear panel 13. Here, the upper end side of the rear wall portion 12 is covered with the roof head lining 8 extending from the ceiling side. Moreover, the inflator 39 and the leading end 34b of a later-described backward pulling portion 34 are covered with the lower edge 8a of the roof head lining 8.

Figure 4:
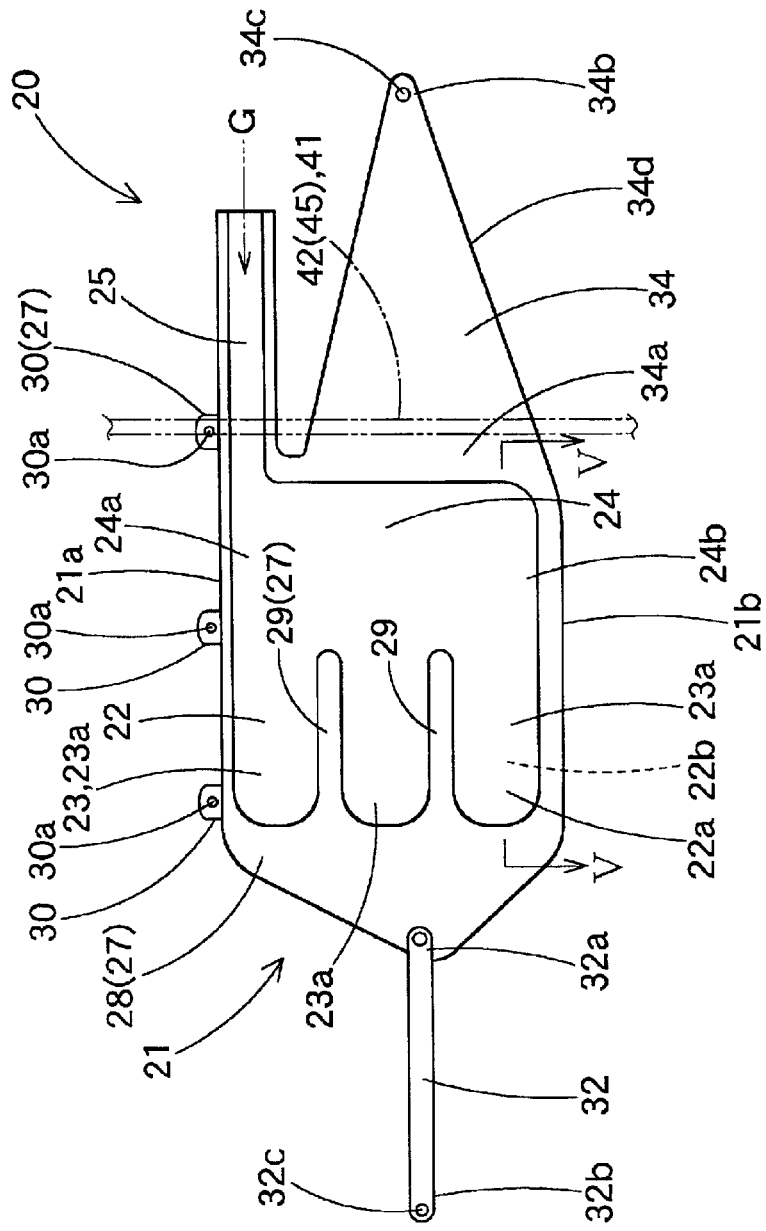
FIG. 4 is a flatly extended front elevation showing the airbag of the first embodiment.
Figure 5:
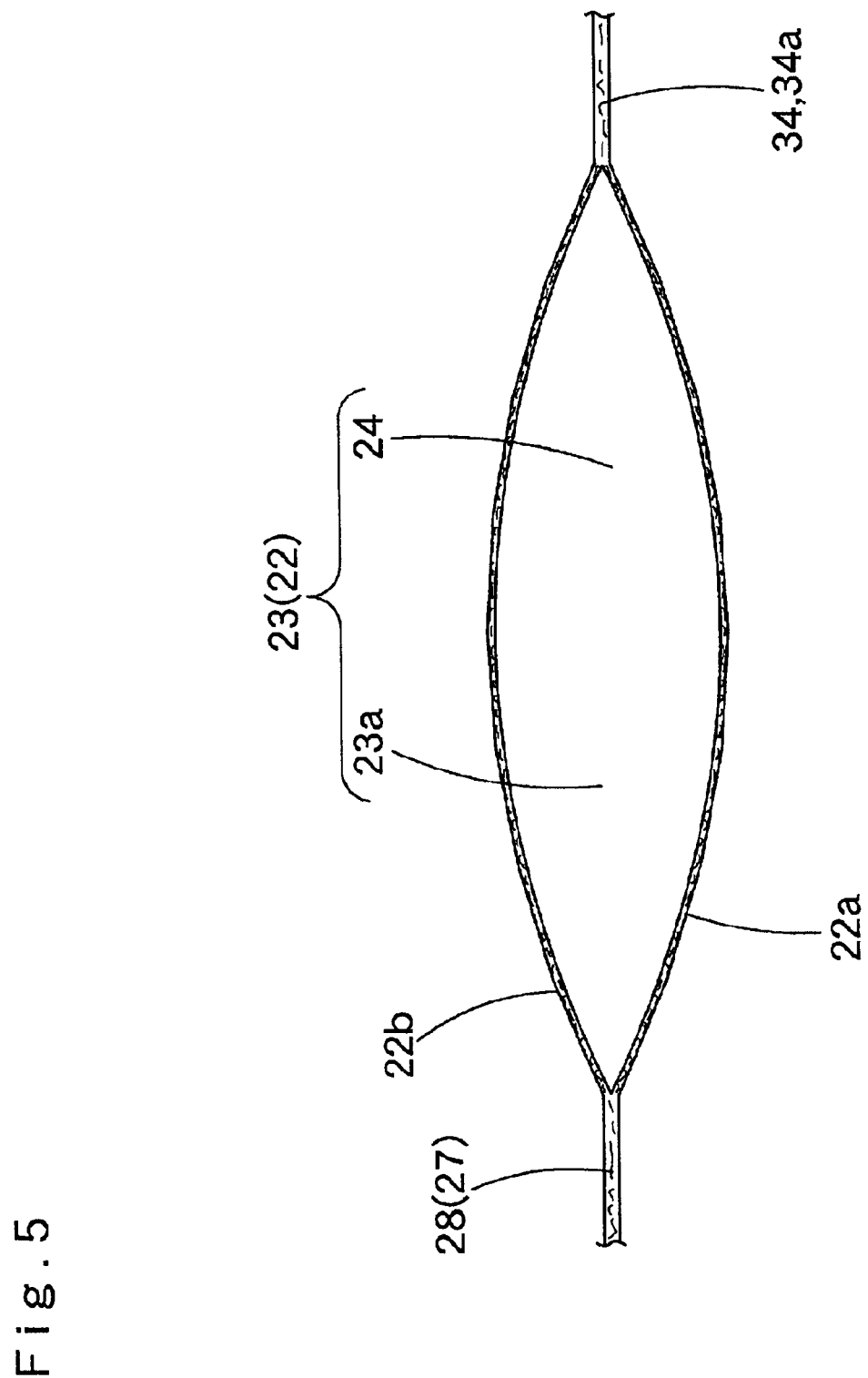
FIG. 5 is a lateral section showing a portion of the airbag of the first embodiment at an expanding time and corresponding to a portion V—V of FIG. 4.
Figure 6:
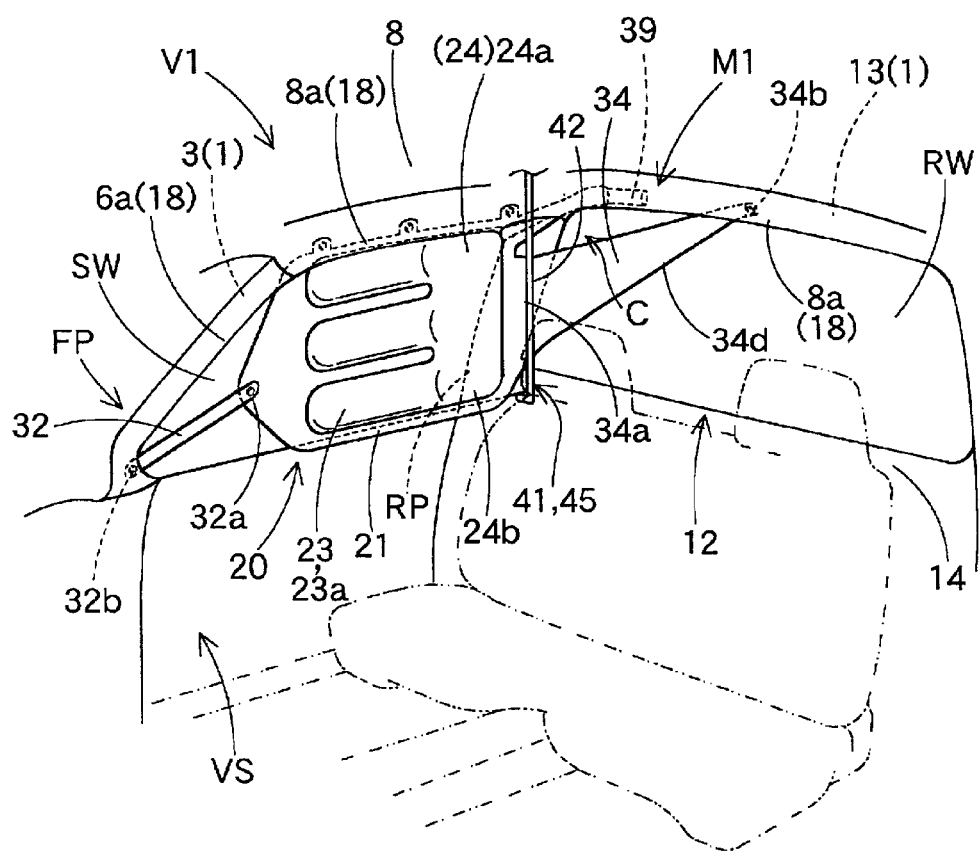
FIG. 6 is a perspective view showing the head protecting airbag device of the first embodiment in use, seen from the vehicle interior side.

The airbag 20 is folded and housed in the upper edge of the side window SW on the interior side. The airbag 20 comprises, as shown in FIGS. 4 to 6, a generally rectangular panel body portion 21, and a forward pulling portion 32 and a backward pulling portion 34 which are arranged on the two longitudinal ends of the body portion 21. This body portion 21 can cover the side window SW. These forward and backward pulling portions 32 and 34 are provided with the leading ends 32b and 34b, respectively, which are removed from the body portion 21 and act as the front side leading end 32b and the rear side leading end 34b of the airbag 20. Moreover, the front side leading end 32b and rear side leading end 34b are mounted on the vehicle body (or the body 1) to develop a longitudinal tension between the leading ends 32b and 34b of the airbag 20 (or the body portion 21) upon completion of the extension and inflation.

The body portion 21 is provided with a gas inlet portion 22 for letting an inflating gas G flow thereinto to expand, and a non-inlet portion 27 that does not let the inflating gas G flow in. The gas inlet portion 22 expands in such a way as to separate the interior side wall portion 22a and the exterior side wall portion 22b.

The gas inlet portion 22 is provided with an expansion portion 23 and an inlet port 25. The expansion portion 23 is inflated to extend and expand into a generally rectangular panel shape for covering the side window SW. The inlet port 25 is formed into a cylindrical shape to communicate with the upper rear of the expansion portion 23 and to extend backward. Moreover, the inlet port 25 is connected at its rear end to the inflator 39. In the area of the expansion portion 23, there are suitably arranged thickness regulating portions 29 as the non-inlet portion 27. The thickness regulating portions 29 are so arranged as to equalize the thickness of the airbag at the peripheral edge and the central portion of the expansion portion 23 when expanded. On the rear end side of the expansion portion 23, moreover, there is arranged a vertical expansion portion 24 which extends in a vertical rod shape at the expanding time. In the case of the embodiment, the vertical expansion portion 24 is arranged in the vicinity and along a guide regulating portion 42 of a later-described guide fixture 45 (or guide means 41) (as referred to double-dotted lines of FIG. 4 and FIG. 6).

The non-inlet portion 27 is provided with a peripheral edge portion 28, two thickness regulating portions 29 and 29, and a plurality of mounting portions 30. The peripheral edge portion 28 is so arranged along the peripheral edge of the body portion 21 as to enclose the expansion portion 23. Each thickness regulating portion 29 is arranged extend from the peripheral edge portion 28 into the expansion portion 23. Each mounting portion 30 is extended upward from the peripheral edge 28, a portion of the upper edge 21a of the body portion 21.

The thickness regulating portions 29 and 29 are individually extended generally in the horizontal direction from the front edge side of the peripheral edge portion 28 to the rear side. Moreover, the thickness regulating portions 29 and 29 are separated from each other above and below, with their ends not intersecting the rear edge side of the peripheral edge portion 28. Between the rear end of each thickness regulating portion 29 and the rear edge side of the peripheral edge portion 28, moreover, there is arranged the aforementioned vertical expansion portion 24. Here, the expansion portion 23 is defined by the thickness regulating portions 29 into three cells 23a extending horizontally and arranged above and below the thickness regulating portions 29 and 29, and the aforementioned one vertical expansion portion 24.

The individual mounting portions 30 are arranged at three positions on the side of the upper edge 21a of the body portion 21. Each mounting portion 30 is provided with a mounting hole 30a for inserting a mounting bolt 37 therethrough, as shown in FIG. 2. Each mounting portion 30 is mounted with a mounting bracket 36 on the inner panel 3 on the side of the body 1 by the mounting bolt 37. In the inner panel 3 of the upper edge side of the side window SW on the side of the body 1, as shown in FIG. 2, there is formed a mounting hole 3a. On the circumference of this mounting hole 3a, there is fixed a nut 3b, into which the mounting bolt 37 is screwed.

The forward pulling portion 32 is extended forward from the front end lower portion side of the body portion 21. The forward pulling portion 32 is mounted and fixed at its leading end 32b on the inner panel 3 of the lower portion of the front pillar portion FP on the side of the body 1. In the leading end 32b of the forward pulling portion 32, there is formed a mounting hole 32c. The leading end 32b is fixed like the mounting portion 30 on the inner panel 3 by making use of the mounting bracket 36 and the mounting bolt 37 (although not shown). Here in the case of the embodiment, the forward pulling portion 32 is formed into a belt shape of a woven fabric of polyester or polyamide. Moreover, the forward pulling portion 32 is jointed at its base end 32a toward the body portion 21 to the body portion 21 by means of an eyelet.

The backward pulling portion 34 is formed into a triangular panel shape which extends backward of the body portion 21 from the lower side of the inlet port 25. Moreover, the backward pulling portion 34 is formed to extend linearly from the vicinity of a lower end 24b of the vertical expansion portion 24. In the leading end 34b of the backward pulling portion 34, moreover, there is formed a mounting hole 34c. Like the mounting portions 30, the leading end 34b is fixed on the rear panel 13 on the body 1 side by means of the mounting bracket 36 and the mounting bolt 37 (although not shown). Here, the fixed position of the leading end 34b on the rear panel 13 is located in the vicinity of the upper edge of the rear wall portion 12 near its center, removed from the vehicle side surface VS. Moreover, the fixed position of the leading end 34b on the rear panel 13 is located at a level as high as the individual mounting portions 30 of the body portion 21.

The backward pulling portion 34 is folded, when housed, together with the body portion 21. The folded backward pulling portion 34 is bent from above the rear pillar portion RP and is arranged at the upper portion of the rear wall portion 12. Moreover, the folded backward pulling portion 34 is housed with its interior side being covered with the lower edge 8a of the roof head lining 8. And, the lower edge 34d of the backward pulling portion 34 is connected to the lower part of the rear end (or the lower end side of the vertical expansion portion 24) of the body portion 21. The longitudinal size of the backward pulling portion 34 is so set that the backward pulling portion 34 can pull the lower end side 24a of the vertical expansion portion 24 backward to develop a longitudinal tension in the lower edge 21a of the body portion 21, when the body portion 21 extends and inflates.

Moreover, the base 34a of the backward pulling portion 34 of the body portion 21 side is so arranged (as referred by double-dotted lines in FIG. 4) as to be forward of the guide regulating portion 42 of the guide fixture 45 (or the guide means 41), as viewed from the interior side I. In other words, when the airbag 20 is extending and expanding, the base portion 34a of the backward pulling portion 34 of the non-inlet portion 27 is arranged on the exterior side O of the guide regulating portion 42 of the guide fixture 45.

Here in the case of the embodiment, the body portion 21 is tubularly woven of yarns of polyester or polyamide together with the backward pulling portion 34. Moreover, the airbag 20 is formed by joining the base portion 32a of the forward pulling portion 32 to the front end side lower portion of the body portion 21.

The inflator 39 is of a cylinder type having a generally cylindrical shape. The inflator 39 is connected to the airbag 20 by fitting it on the rear end of the inlet port 25 of the airbag 20. Moreover, the inflator 39 is mounted and fixed on the upper edge side of the rear panel 13 of the rear wall portion 12 by making use of a not-shown bracket. The inflator 39 is covered on its interior side with the lower edge 8a of the roof head lining 8.

The airbag cover 18 covers the folded airbag 20 and the inflator 39. In the case of the embodiment, the airbag cover 18 comprises the lower edge 6a of the front pillar garnish 6, and the lower edge 8a of the roof head lining 8 on the upper edge side of the side window SW. The airbag cover 18 constructed at the lower edge 8a of the roof head lining 8, is formed, in the case of the embodiment, to extend from a position just above the side window SW through a position just above the rear pillar portion RP to the vicinity of the transverse center of the rear wall portion 12. Moreover, the airbag cover 18 composed of the individual lower edges 6a and 8a is provided with a thinned hinge portion 18a on the upper edge side of the opening portion, as shown in FIGS. 2 and 3. This hinge portion 18a is formed so that the airbag cover 18 may be easily pushed and opened toward the interior side by the airbag 20. When the airbag 20 is housed, the pillar garnish lower edge 6a covers the portions of the forward pulling portion 32 and the front end side of the body portion 21. Moreover, the roof head lining lower edge 8a just above the side window SW covers the body portion 21. Still moreover, the roof head lining lower edge 8a just above the rear pillar portion RP covers a portion of the rear side of the body portion 21 containing the inlet port 25 and the base portion 34a of the backward pulling portion 34. Furthermore, the roof head lining lower edge 8a located on the upper side of the rear wall portion 12 covers the inlet port 25, the inflator 39 and the backward pulling portion 34.

In the case of the first embodiment, the guide means 41 is formed of the guide fixture 45 made of an elongated metal pipe member. This guide fixture 45 is formed into an L-shape as shown in FIGS. 1, 3 and 6, with the vertically extending guide regulating portion 42 and a joint portion 43 which is bend and extended from the lower end of the guide regulating portion 42 toward the exterior side O. The guide regulating portion 42 is arranged at a portion near the corner portion C on the interior side I of the rear pillar portion RP. At the joint portion 43, the guide fixture 45 is mounted on the inner panel 3 of the body 1. In the case of the embodiment, the joint portion 43 is provided on its exterior side end with a mounting seat 46 having a mounting hole 46a to insert the bolt 4 thereinto. This mounting seat 46 is fastened by the bolt 4 together with the mounting portion 10c of the upper panel 10 of the rear pillar garnish 9 and is fixed on the inner panel 3.

In the guide fixture 45, moreover, the guide regulating portion 42 is mounted so as not to move toward the interior side I by inserting its upper end 47 through the roof head lining 8 into a through hole 3e of the inner panel 3 (as referred to FIG. 3).

Moreover, the guide regulating portion 42 of the guide fixture 45 is constructed of a portion protruded downward from the roof head lining 8 to the joint portion 43. When the airbag 20 extends and expands, the guide regulating portion 42 guides the vicinity of the base portion 34a of the backward pulling portion 34 near the corner portion C of the airbag 20 so that the base portion 34a may protrude downward from the airbag cover 18 without deviating much toward the interior side I. Upon completion of the extension and expansion of the airbag 20, moreover, the guide regulating portion 42 regulates the position of the vicinity of the base portion 34a of the backward pulling portion 34 in the airbag 20 so that the vicinity of the base portion 34a may not move toward the interior side I while covering the interior side I of the upper panel 10.

Here will be described how to mount the head protecting airbag device M1 of this first embodiment on the vehicle V1. First of all, the airbag 20 is folded. In this folding, the body portion 21 of the airbag 20 is so folded in bellows form as to bring the lower edge 21b close to the upper edge 21a. At this time, the forward and backward pulling portions 32 and 34 of the airbag 20 are also folded together with the body portion 21 (as referred to FIGS. 2 and 3). Then, the airbag 20 is suitably wrapped with a breakable tape member 35 which keeps the airbag in folded condition.

After this, the mounting brackets 36 are attached to the individual mounting portions 30 and the leading ends 32b and 34b of the forward and backward pulling portions 32 and 34. Moreover, the folded inlet port 25 is unfolded, and the inflator 39 is inserted into the inlet port 25. Then, the not-shown mounting brackets are attached to the circumference of the inlet port 25 having the inflator 39 inserted, so that the inflator 39 is integrated with the airbag 20 to prepare the airbag assembly.

After this, the individual mounting portions 30 and the forward and backward pulling portion leading ends 32b and 34b are mounted and fixed on the inner panel 3 and the rear panel 13 by means of the mounting bolts 37. At the same time, the inflator 39 is mounted and fixed on the rear panel 13 by means of the not-shown mounting brackets and bolts. Then, the airbag assembly can be mounted in the body 1 of the vehicle V1.

Moreover, not-shown lead wires leading from the inflator 39 are connected with a predetermined airbag operating circuit. In the front pillar portion FP, the front pillar garnish 6 is mounted and fixed on the inner panel 3. In the roof side rail portion RR, the roof head lining 8 is mounted and fixed on the inner panel 3. In the rear pillar portion RP, moreover, the mounting seat 46 of the guide fixture 45 is fastened together by means of the bolt 4 or the like on the inner panel 3 while the upper end 47 of the guide fixture 45 is inserted through the roof head lining 8 into the through hole 3e. When the pillar garnish 9 is then fixed on the inner panel 3 of the body 1, the head protecting airbag device M1 can be mounted on the vehicle If the inflator 39 is activated, the inflating gas G flows from the inlet port 25 into the expansion portion 23 to break the tape member 35 so that the expansion portion 23 extends and expands. The airbag 20 pushes and opens the lower edges 6a and 8a of the pillar garnish 6 and the roof head lining 8 acting as the airbag cover 18 toward the interior side I, as shown by double-dotted lines in FIGS. 2 and 3, so that it protrudes downward from the upper edge of the side window SW, as shown in FIG. 6. Then, the airbag body portion 21 covers the interior side of the side window SW.

At this extending and expanding time, the airbag 20 protrudes downward from the upper edge side of the side window SW while the base portion 34a of the backward pulling portion 34 near the corner portion C on the side of the body portion 21 is guided by the guide regulating portion 42 of the guide fixture 45. In other words, the base portion 34a of the backward pulling portion 34 next to the body portion 21 protrudes downward from the lower edge 8a of the roof head lining 8 which extends from a position above the rear pillar portion RP to an upper portion near the transverse center of the rear wall portion 12. Then, the airbag 20 completes the extension and expansion such that the movement at the vicinity of the base portion 34a of the backward pulling portion 34 near the corner portion C toward the interior side I is regulated by the guide regulating portion 42 of the guide fixture 45.

At this time, the airbag 20 is mounted, at the leading end 32b of the forward pulling portion 32 away from the body portion 21, on the inner panel 3 on the lower side of the front pillar portion FP on the front side of the side window SW. Moreover, the leading end 34b of the backward pulling portion 34 away from the body portion 21 is mounted on the upper portion of the transverse middle portion of the rear panel 13 of the rear wall portion 12 removed from the vehicle side face VS. In the embodiment, moreover, the backward pulling portion 34 of the airbag 20 is bent toward the interior side I at the portion of the guide regulating portion 42 in the vicinity of the corner portion C as it extends from the vicinity of the base portion 34a to the leading end 34b. However, the airbag 20 of the embodiment is not loosened because the backward pulling portion 34 is kept from moving into the interior side I by the guide regulating portion 42.

As a result, the longitudinal tension can be developed without any trouble in the airbag 20 having completed the extension and expansion at the body portion 21 between the leading ends 32b and 34b of the forward and backward pulling portions 32 and 34, especially, on the lower end 21b side of the body portion 21.

Therefore, the head protecting airbag device M1 of the first embodiment can develop the longitudinal tension easily in the airbag 20 with completion of the extension and expansion, even if it is mounted on the single-cab vehicle V1 in which the rear wall portion 12 is arranged generally perpendicularly to the rear side of the side window SW to be covered with the airbag 20. Even if the airbag body portion 21 is pushed toward the exterior side O by the passenger seated on the seat SE, therefore, it hardly moves at all and can restrain the passenger properly.

In the first embodiment, moreover, the guide means 41 for guiding and regulating the movement of the vicinity of the base portion 34a of the backward pulling portion 34 in the airbag 20 is constructed of the guide fixture 45 made of a long metal member. This guide fixture 45 is so rigid as to smoothly guide and regulate the movement of the base portion 34a of the backward pulling portion 34 in the vicinity of the corner portion C.

In the first embodiment, moreover, the airbag 20 is provided with the vertically extending vertical expansion portion 24 of the expansion portion 23 in the body portion 21 for admitting the inflating gas G. The vertical expansion portion 24 expands, when it admits the inflating gas G, so that it shrinks the body portion 21 longitudinally. Therefore, strong longitudinal tension can be developed in the airbag body portion 21.

In the first embodiment, moreover, the airbag 20 is provided with the vertical expansion portion 24 which is arranged in the vicinity of the guide regulating portion 42 of the guide fixture 45 and at the rear end side of the body portion 21. When the vertical expansion portion 24 is charged with the inflating gas G when the airbag is extending and expanding 20, it exhibits a rigidity to some extent. Upon completion of the expansion of the airbag 20, moreover, the vertical expansion portion 24 is pulled at its lower end 24b backward of the vehicle V1 by the lower edge 34d of the backward pulling portion 34 extending generally linearly from the lower end 24b of the vertical expansion portion 24. In other words, the vertical expansion portion 24 is turned backward at its lower end 24b pivoting on its upper end 24a so that the higher longitudinal tension is developed on the lower edge 21b side of the airbag body portion 21.

In the first embodiment, moreover, when the airbag 20 is extending and expanding, the base portion 34a of the backward pulling portion 34 of the non-inlet portion 27 is on the exterior side O of the guide regulating portion 42 in the guide fixture 45. Therefore, the guide regulating portion 42 can be extremely close to the exterior side O, leaving more space in the interior side I. As long as there is no trouble in the sliding movement of the airbag 20 to the guide means 41 (or the guide fixture 45) of the guide regulating portion 42, it permissible that the backward pulling portion 34 is partially inflated by feeding the inflating gas. Moreover, the forward pulling portion 32 may also be fed with the inflating gas.

Here, the first embodiment has been described in the case in which the upper end 47 of the guide fixture 45 is mounted on the inner panel 3 by inserting it into the through hole 3e. It is natural that the guide fixture 45 may instead be joined on its upper end 47 to the inner panel 3 by means of a predetermined bolt. Moreover, the guide fixture 45 should not be limited to the L-shape but may be formed into a sideways rectangular U-shape. In this modification, the vertically extending portion of the sideways rectangular "U" shape is used as the guide regulating portion 42, and the portions at the two ends of the vertical portion are used as the joint portions 43. Then, these individual joint portions 43 are jointed to the inner panel 3. The guide fixture 45 may also be modified such that only the upper end 47 is coupled to the inner panel 3 on the side of the body 1.

Here will be described a head protecting airbag device M2 according to a second embodiment of the invention.

Figure 7:
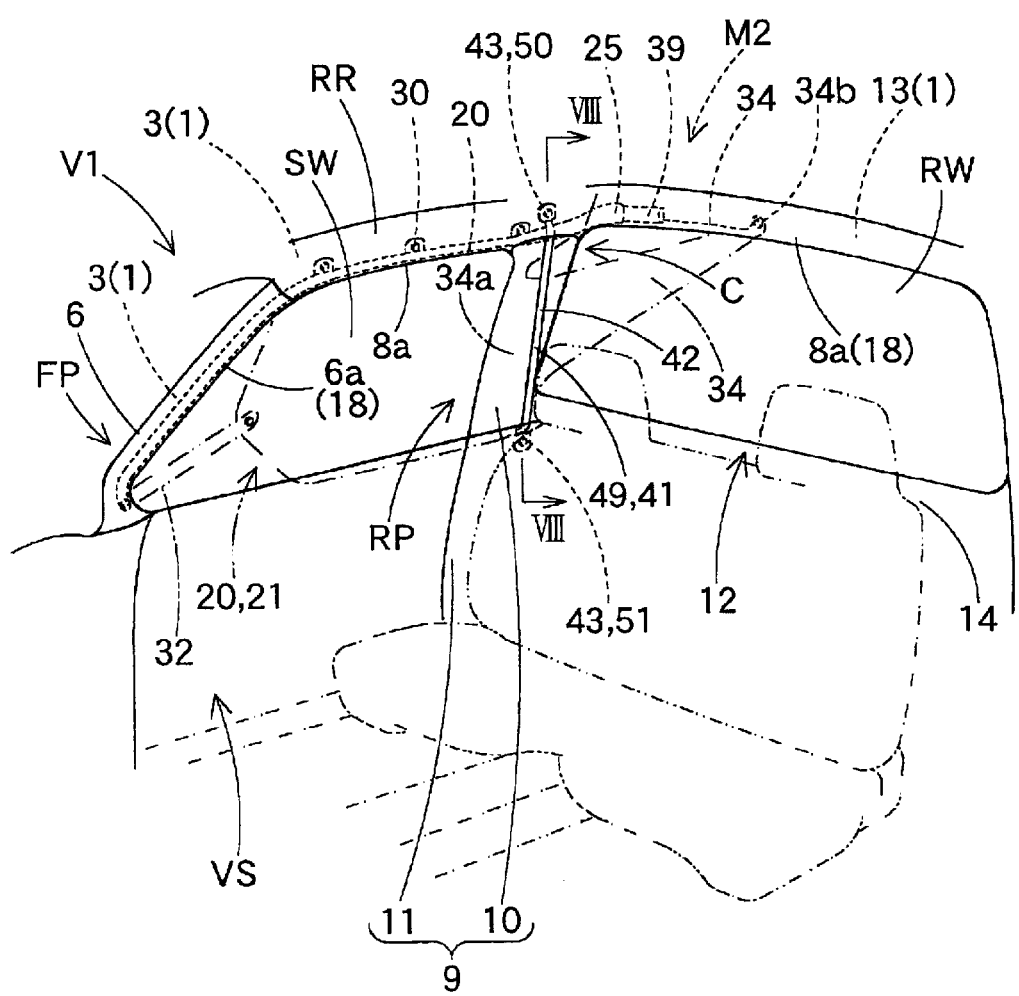
FIG. 7 is a perspective view showing a used mode of a head protecting airbag device of a second embodiment according to the present invention, seen from the vehicle interior side.
Figure 8:
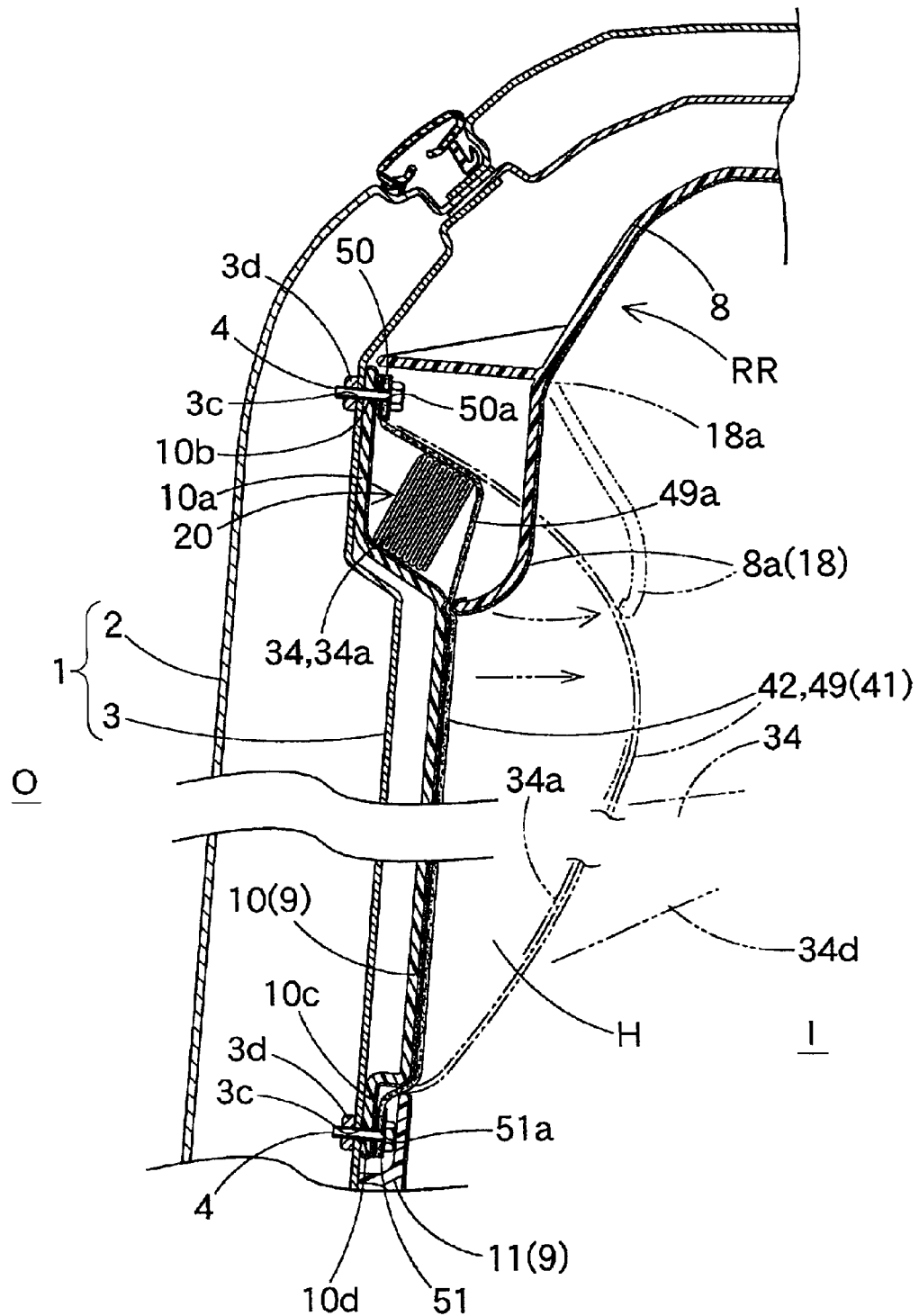
FIG. 8 is a vertical section of a portion VIII—VIII of FIG. 7.
Figure 9:
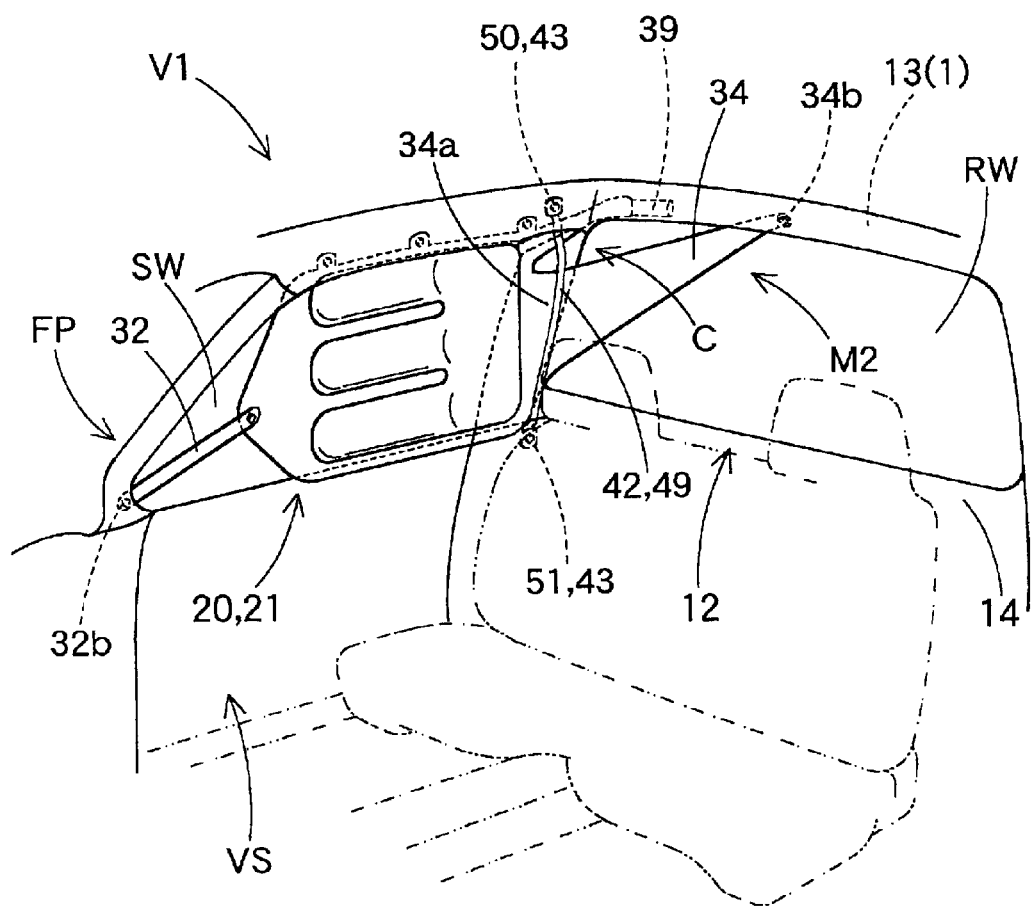
FIG. 9 is a perspective view showing the head protecting airbag device of the second embodiment in use, seen from the vehicle interior side.

In the head protecting airbag device M2 of the second embodiment shown in FIGS. 7 and 8, the guide means 41 is formed of a flexible linear belt 49 unlike the head protecting airbag device M1 of the first embodiment. Here, the second embodiment is different in that the guide means 41 is formed of the belt 49, but is similar in other members such as the airbag 20 or the inflator 39 to the first embodiment. Therefore, the common members and portions will be omitted from description here, designating them by the same reference numerals.

This belt 49 comprises the vertically extending guide regulating portion 42 and the joint portions 43 and 43 arranged at the upper and lower ends of the guide regulating portion 42. This guide regulating portion 42 makes possible the guiding and regulation movement of the vicinity of the base portion 34a of the backward pulling portion 34 of the airbag 20. The joint portions 43 and 43 are jointed to the vehicle body (or the body 1) side. Moreover, the individual joint portions 43 have mounting seats 50 and 51 having mounting holes 50a and 51a for inserting the bolts 4 thereinto. These mounting seats 50 and 51 are fastened and jointed to the inner panel 3 near the corner portion C together with the upper and lower mounting portions 10a and 10c of the upper panel 10 of the rear pillar garnish 9 by means of the bolts 4. Here, the upper portion 49a of the guide regulating portion 42 of the belt 49 is covered with the lower edge 8a of the roof head lining 8.

Moreover, the length of the guide regulating portion 42 between the mounting seats 50 and 51 of the belt 49 is set in the following manner. Specifically, the length is set to form a predetermined clearance H between the exterior side O of the guide regulating portion 42 and the interior side I of the upper panel 10. This clearance H is set to guide the vicinity of the base portion 34a of the backward pulling portion 34 smoothly downward when the airbag 20 is extending and expanding.

In this head protecting airbag device M2 of the second embodiment, too, the airbag 20 folded on the upper edge side of the side window SW extends and expands downward when activated after having been mounted on the vehicle V1, to cover the side window SW with the body portion 21.

Moreover, the airbag 20 protrudes downward from the upper edge side of the side window SW while the base portion 34a side of the backward pulling portion 34 is guided by the guide regulating portion 42 of the belt 49. Moreover, the airbag 20 completes its extension and expansion with the movement of the vicinity of the base portion 34a of the backward pulling portion 34 toward the interior side I restrained by the guide regulating portion 42 of the belt 49.

At this time, like the first embodiment, the airbag 20 is mounted the leading end 32b side of the forward pulling portion 32 on the front side pillar portion FP of the side window SW. Moreover, the leading end 34b side of the backward pulling portion 34 is mounted at a position of the rear wall portion 12 apart from the vehicle side face VS. Further, the backward pulling portion 34 of the airbag 20 is bent toward the interior side I at a portion of the guide regulating portion 42 near the corner portion C as it extends from the base portion 34a to the leading end 34b. In the embodiment, however, the airbag 20 is not loosened because the backward pulling portion 34 is regulated from moving toward the interior I by the guide regulating portion 42 of the belt 49.

As a result, upon completion of the extension and expansion of the airbag 20 of the second embodiment, too, the longitudinal tension can be developed in the body portion 21 without any trouble. Therefore, the airbag device M2 of the second embodiment can also exhibit actions and effects similar to those of the airbag device M1 of the first embodiment.

Here, the second embodiment employs the flexible belt 49 as the guide means 41 so that it will not give a physical discomfort even to a passenger touching it.

Moreover, the second embodiment employs the airbag 20 like the first embodiment. Therefore, the second embodiment can exhibit actions and effects similar to those of the first embodiment when the airbag 20 extends and expands.

Figure 10:
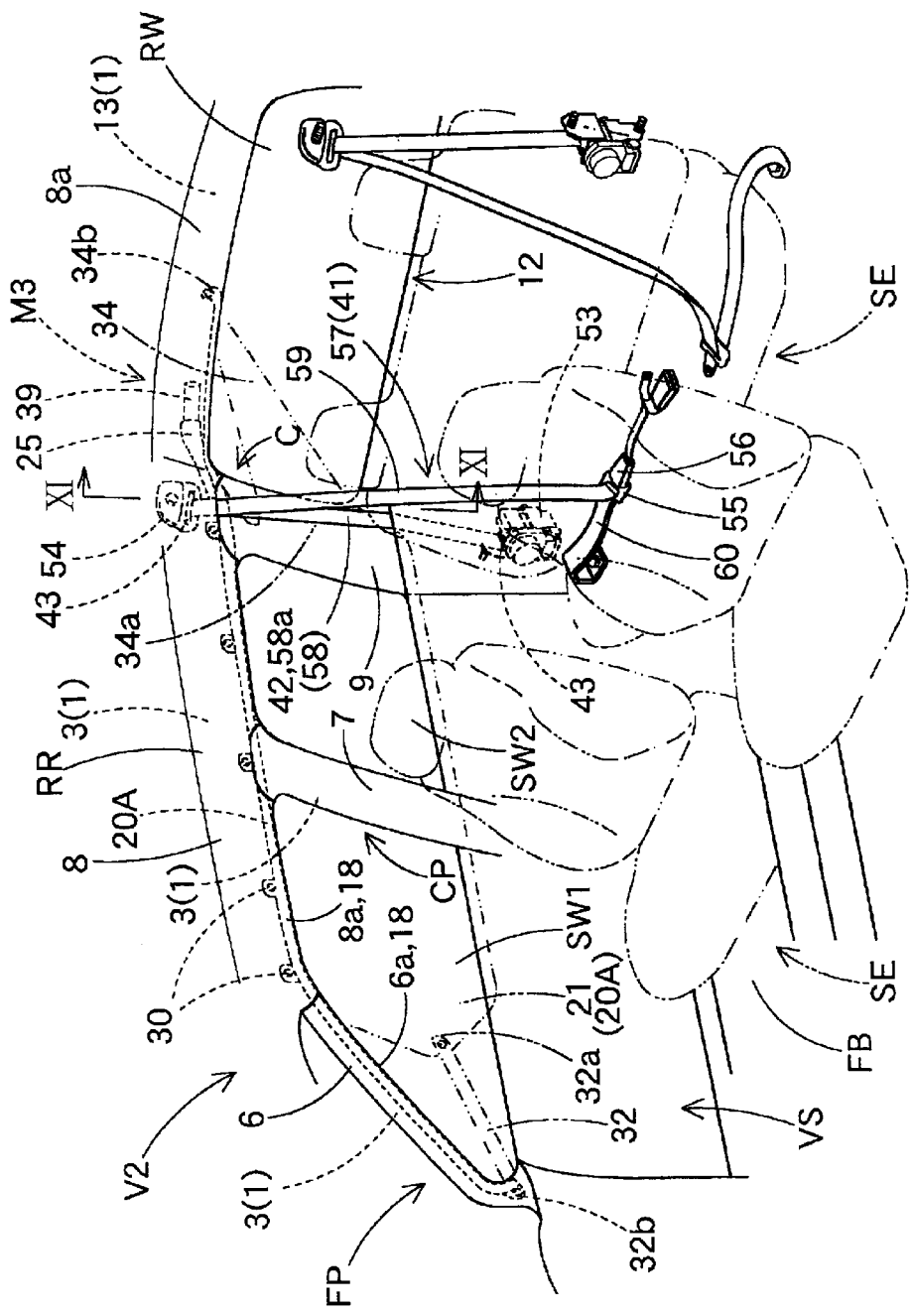
FIG. 10 is a perspective view showing a head protecting airbag device of a third embodiment according to the present invention in use, seen from the vehicle interior side.
Figure 11:
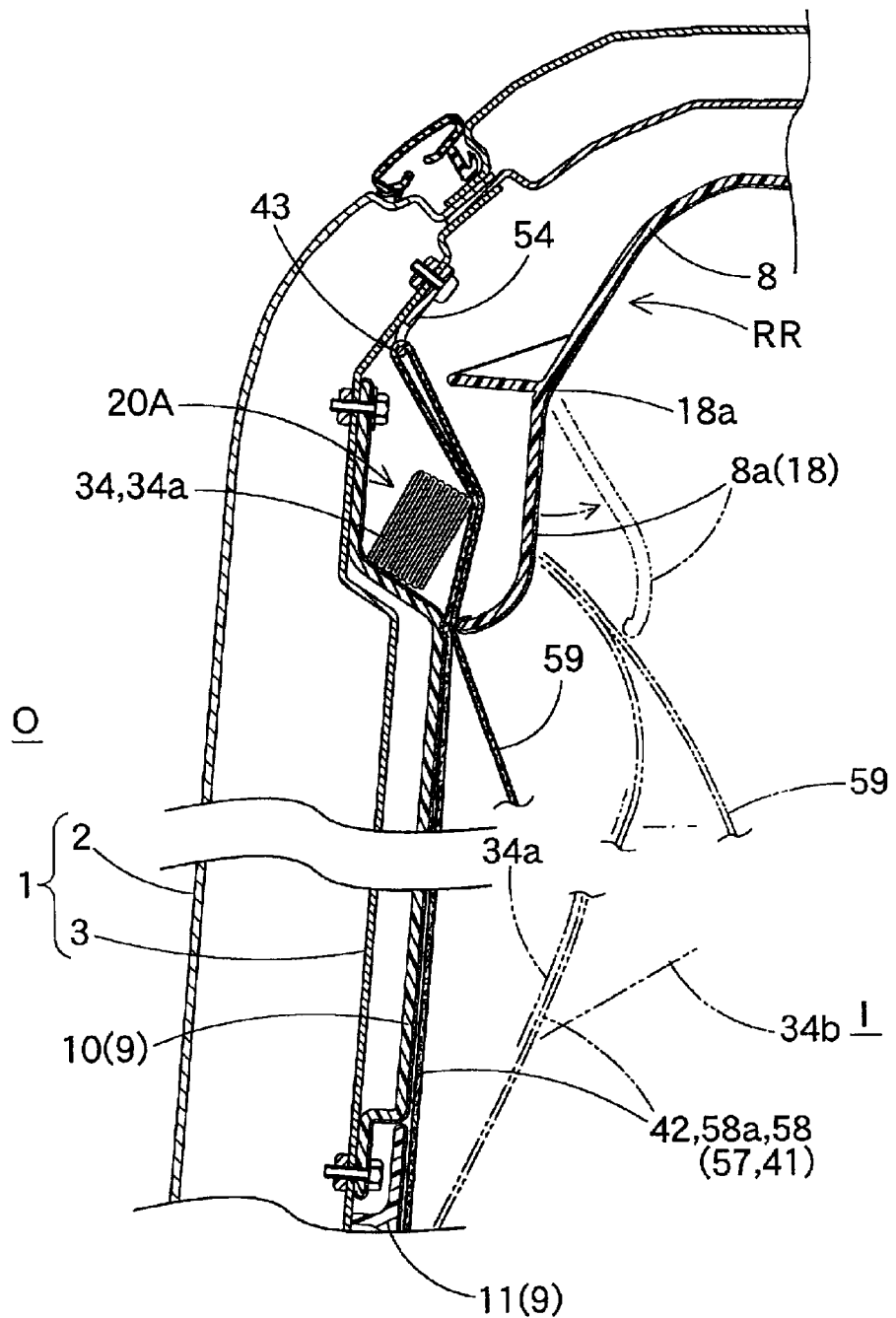
FIG. 11 is a vertical section of a portion XI—XI of FIG. 10.
Figure 12:
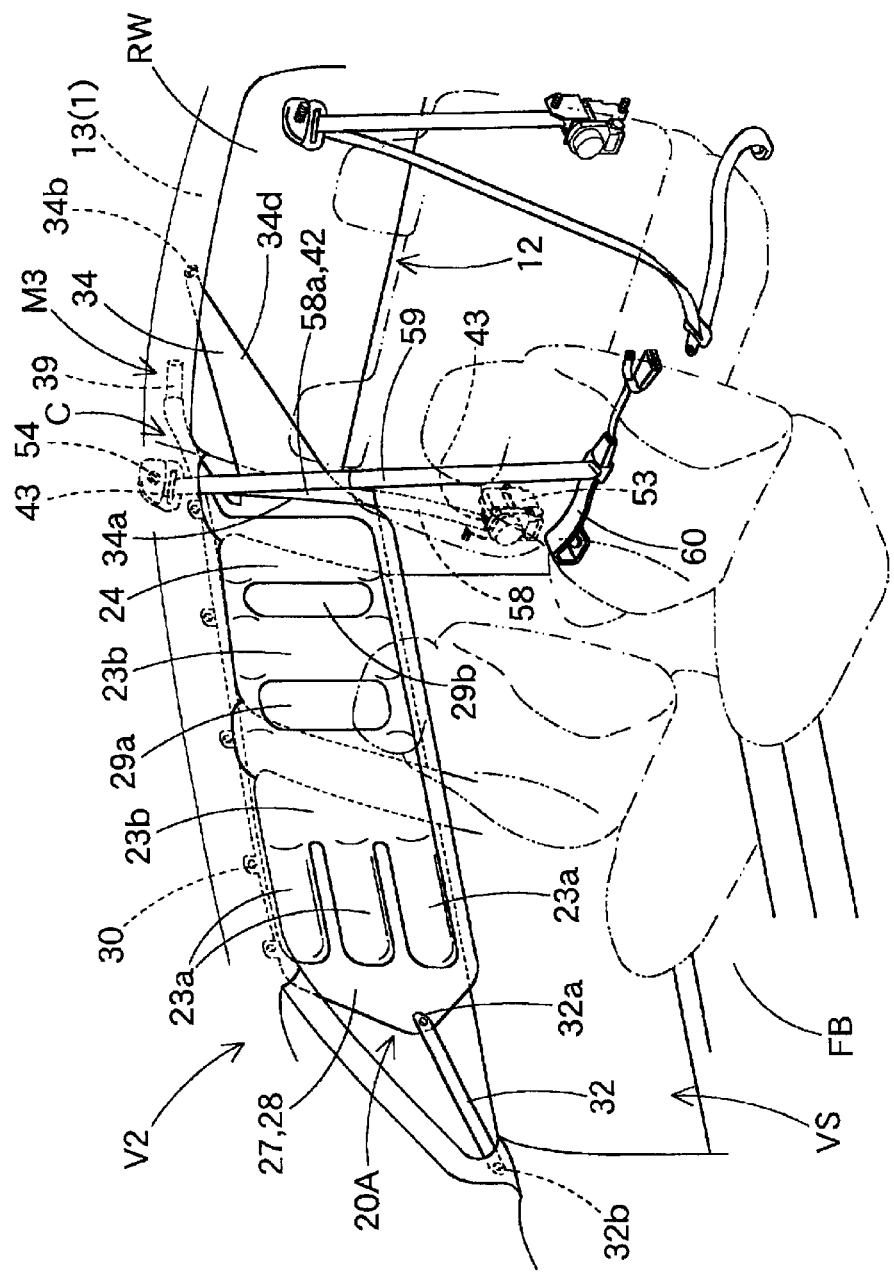
FIG. 12 is a perspective view showing the head protecting airbag device of the third embodiment in operation, seen from the vehicle interior side.

In case a belt is employed as the guide means 41, it may be exemplified by a seat belt 57 which is arranged in the vicinity of the corner portion C as in a head protecting airbag device M3 of a third embodiment, as shown in FIGS. 10 to 12. This third embodiment is different in that the seat belt 57 is used as the guide means 41, and in that a vehicle V2 for mounting the airbag device M3 is a double-cab vehicle and employs a airbag 20A long in the longitudinal direction. Other members such as the inflator 39 are similar to those of the first embodiment, and the common members and portions are suitably omitted from description here, giving them the same reference numerals as those of the first embodiment.

In this double-cab vehicle V2, the seats SE are arranged in front and rear rows, and the side window SW to be arranged on the vehicle side faces VS are long in the longitudinal direction. At a longitudinally intermediate portion of the side window SW, moreover, there is arranged a center pillar portion CP. The side window SW is provided with a front side window SW1 and a rear side window SW2. In the case of the embodiment, the side window SW1 is the window of the front door, and the side window SW2 is the window of the rear door. Moreover, the center pillar portion CP is provided with an inner panel 3 on the vehicle body (or the body 1) side and a pillar garnish 7 covering the interior side of the pillar portion CP.

Moreover, the airbag 20A for covering the interior side of the side window SW (SW1 and SW2) including the center pillar portion CP is formed to have the body portion 21 elongated in the longitudinal directions. The body portion 21 has vertical thickness regulating portions 29a and 29b arranged between the vertical expansion portion 24 on the rear end side and the transverse long cells 23a on the front end side. To the front of the individual thickness regulating portions 29a and 20b, moreover, there are arranged vertical expansion portions 23b and 23b.

The seat belt 57 is located as the guide means 41 at a portion near base portion 58 (i.e., toward upper portion 58a) between a pre-tensioner 53 and an anchor 54. The seat belt 57 comprises the base portion 58, an intermediate portion 59 and a leading end portion 60. The base portion 58 is the belt portion wound off the pre-tensioner 53, up to the anchor 54.

The intermediate portion 59 is the belt portion from the anchor 54 up to a tongue 55 extending downward. The leading end portion 60 is a belt portion from the tongue 55 to the portion to be fixed on the floor panel FB of the vehicle V2.

Here, the seat belt 57 is used by the seated passenger by fastening the tongue 55 to a buckle 56 fixed to the floor panel FB. At this time, the seat belt 57 is automatically wound from the pre-tensioner 53. Moreover, this pre-tensioner 53 develops such a biasing force at a normal time as to pull back the belt 57 while allowing it to be wound off. Moreover, the pre-tensioner 53 is provided with a lock mechanism for stopping the let-off of the belt 57 when an impact acts on the vehicle V2. The anchor 54 holds the belt 57 in a threading manner. The tongue 55 is so attached to the belt as to be able to move along the belt 57.

Moreover, the pre-tensioner 53 is fixed on the inner panel 3 and covered with the lower panel 11 of the rear pillar garnish 9. The anchor 54 is fixed on the inner panel 3 and covered with the roof head lining lower edge 8a over the rear pillar portion RP.

Moreover, the seat belt 57 forming the guide means 41 comprises the guide regulating portion 42, and the joint portions 43 and 43 jointed to the body 1 side at the upper and lower ends of the guide regulating portion 42. Specifically, the upper portion 58a of the base portion 58 between the pre-tensioner 53 and the anchor 54 is used as the guide regulating portion 42. Moreover, the portions to be retained by the pre-tensioner 53 and the anchor 54 are used as the joint portions 43 and 43.

In this head protecting airbag device M3 of the third embodiment, too, the airbag 20A mounted on the vehicle V2 by being folded on the upper edge side of the side window SW extends and expands downward to cover the side windows SW1 and SW2 with its body portion 21.

Moreover, the airbag 20A protrudes downward from the upper edge side of the side window SW while the base portion 34a side of the backward pulling portion 34 in the vicinity of the corner portion C is guided by the guide regulating portion 42 constructed of the base portion 58 of the seat belt 57. Moreover, the airbag 20A completes the extension and expansion such that the movement near the base portion 34a of the backward pulling portion 34 toward the interior side I being regulated by the guide regulating portion 42 consisting of the base portion 58.

In the airbag 20A at this time, like the first embodiment, the leading end 32b of the forward pulling portion 32 is mounted on the front pillar portion FP of the front side of the side window SW. Moreover, the leading end 34b of the backward pulling portion 34 is mounted on the rear wall portion 12 apart from the vehicle side face VS. Moreover, the backward pulling portion 34 of the airbag 20A is bent toward the interior side I at the portion of the guide regulating portion 42 near the corner portion C as it extends from the vicinity of the base portion 34a to the leading end 34b. However, airbag 20A of the embodiment is not loosened because the backward pulling portion 34 is kept from moving to the interior side I by the guide regulating portion 42 of the belt 57.

As a result, upon completion of the extension and expansion of the airbag 20A of the third embodiment, too, the longitudinal tension can be developed in the body portion 21 without any trouble. Therefore, the airbag device M3 of the third embodiment can also exhibit actions and effects similar to those of the airbag device M2 of the second embodiment.

Here, at the operating time of the airbag device M3, the base portion 58 of the seat belt 57 is suppressed from moving toward the interior side I because the pre-tensioner 53 activates the lock mechanism. As a result, the seat belt 57 can smoothly act as the guide regulating portion 42 to guide the backward pulling portion 34 in the vicinity of the base portion 34a downward and to restrain the movement of the same toward the interior side I.

In the third embodiment, moreover, the guide means 41 is constructed by utilizing the seat belt 57 mounted on the vehicle V2. Therefore, it is possible to minimize the increase in the number of components and in the number of assembling steps of the head protecting airbag device M3.

In the third embodiment, moreover, there is employed the airbag 20A which has a construction similar to that of the airbag 20 employed in the first and second embodiment, excepting the body portion 21. Therefore, this embodiment can exhibit actions and effects similar to those of the first embodiment when the airbag 20A is extending and expanding.

In the airbag 20A, moreover, there are juxtaposed a plurality of vertical expansion portions 23b, 23b and 24 which are arranged in the vertical direction. Therefore, higher longitudinal tension can be developed in the body portion 21 when the airbag is extending and expanding.

Figure 13:
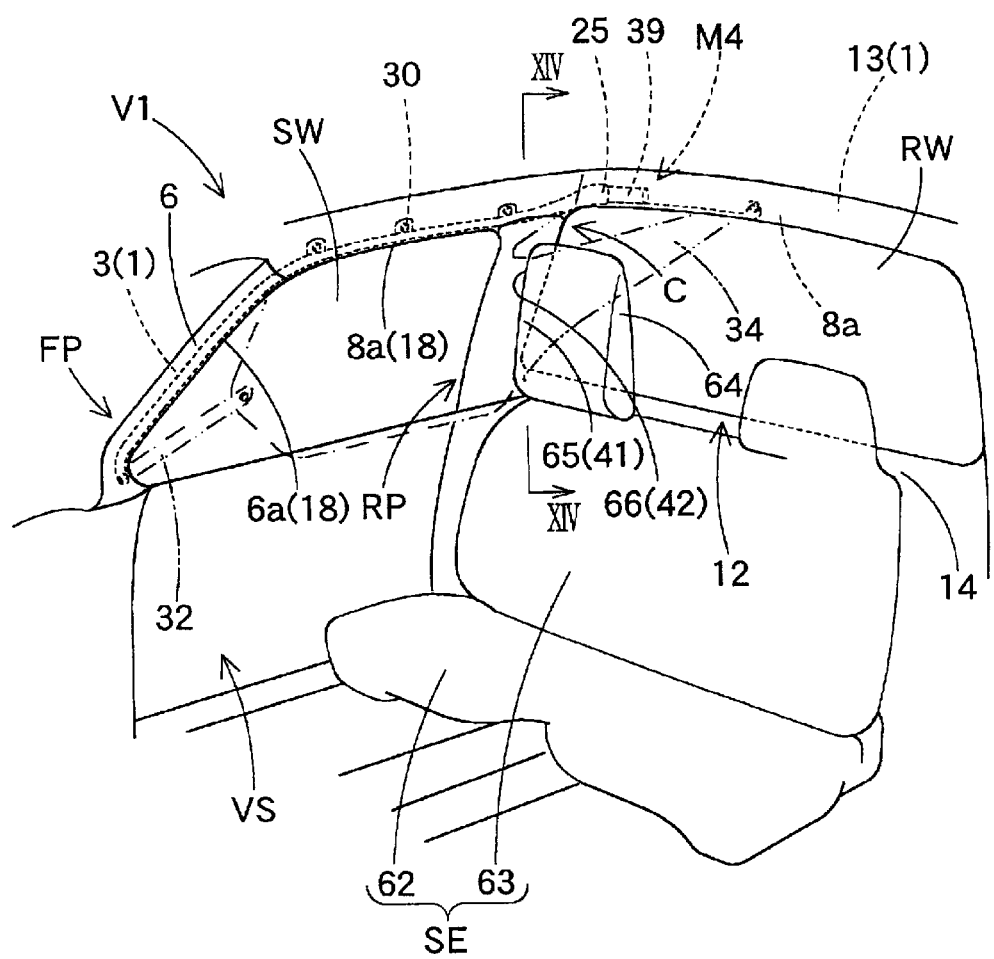
FIG. 13 is a perspective view showing a head protecting airbag device of a fourth embodiment according to the present invention in use, seen from the vehicle interior side.
Figure 14:
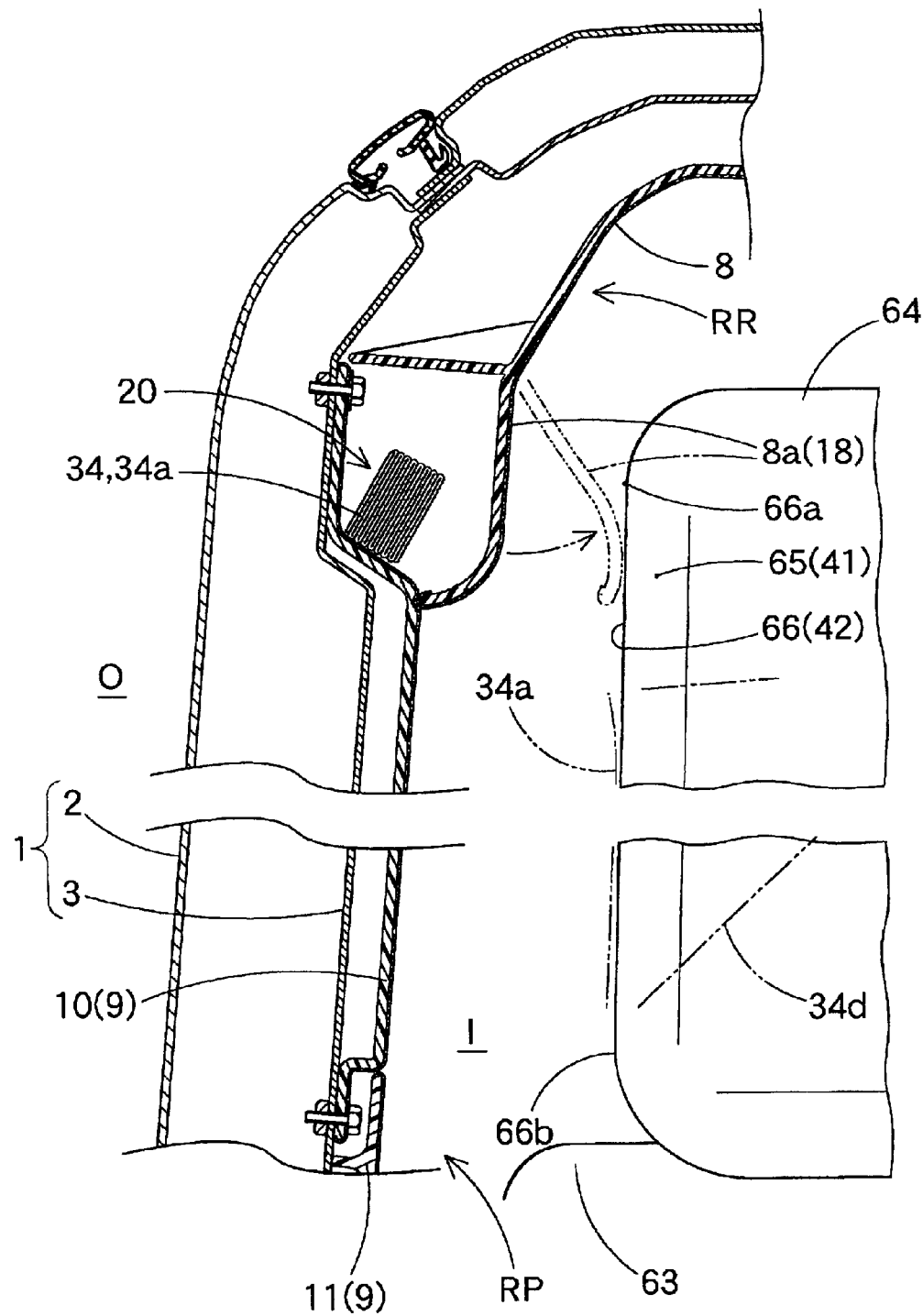
FIG. 14 is a vertical section of a portion XIV—XIV of FIG. 13.
Figure 15:
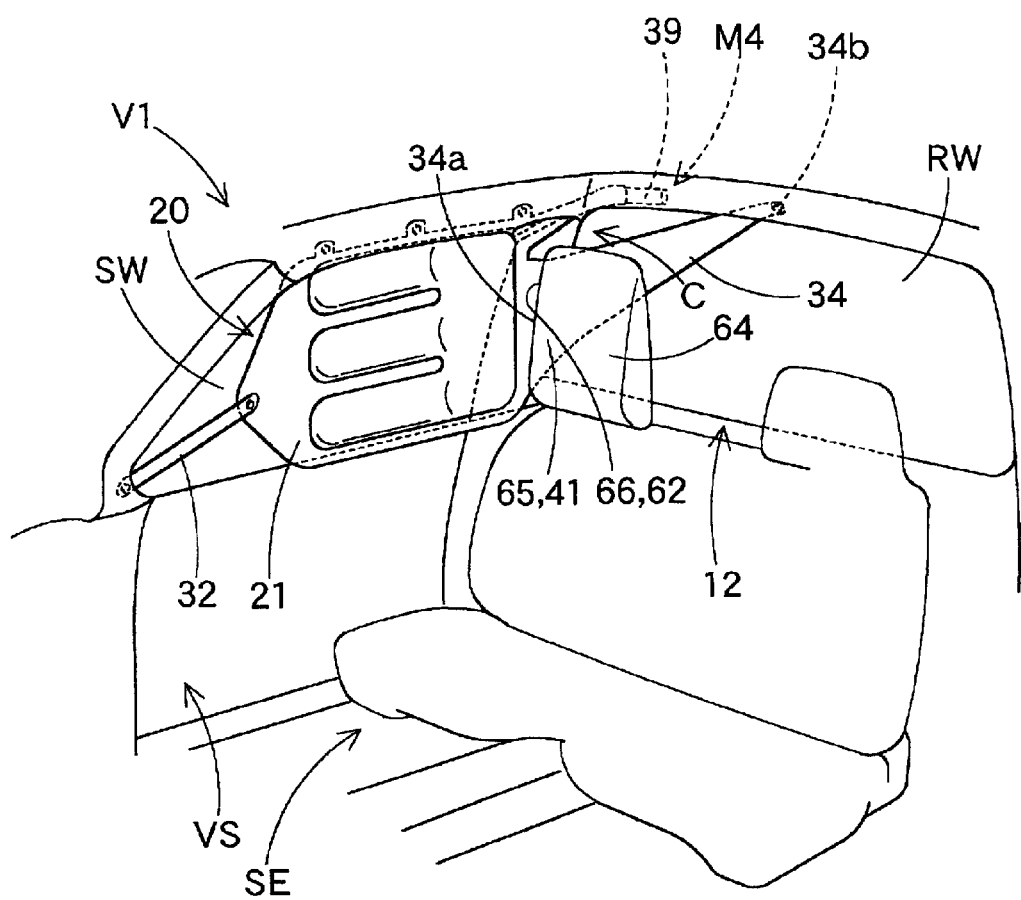
FIG. 15 is a perspective view showing the head protecting airbag device of the fourth embodiment in operation, seen from the vehicle interior side.

Moreover, the guide means 41 may utilize the seat SE as in a head protecting airbag device M4, as shown in FIGS. 13 to 15. This fourth embodiment is difference from the first embodiment in that the guide means 41 is on the seat SE. The other members such as the airbag 20 and the inflator 39 are similar to those of the first embodiment. The common members and portions are omitted from description here, designating them by the same reference numerals as those of the first embodiment.

The seat SE having the guide means 41 is arranged in the vicinity of the rear pillar portion RP of the vehicle V1 and is provided with a lower portion 62 and a back portion 63. At the upper end of the back portion 63, there is arranged a head rest 64. Moreover, the side of the head rest 64 toward the rear pillar portion RP in the vicinity of the corner portion C is extended toward the rear pillar portion RP and upward to form an extension portion 65 as the guide means 41. In other words, an exterior side O face 66 of the extension portion 65 is a guide regulating face, which is arranged generally vertically. Also, the guide regulating face 66 extends upward from the back portion 63 of the seat SE. The extension portion 65 (or the guide regulating face 66) has an upper end 66a arranged in the vicinity of the roof head lining lower edge 8a above the rear pillar portion RP. Moreover, the extension portion 65 has a lower end 66b arranged near the lower end of the upper panel 10 of the rear pillar garnish 9.

In this head protecting airbag device M4 of the fourth embodiment, too, the airbag 20 mounted on the vehicle V1 by being folded on the upper edge side of the side window SW extends and expands downward, and when activated covers the side window SW with the body portion 21.

Moreover, the airbag 20 protrudes downward from the upper edge side of the side window SW while the base portion 34a side of the backward pulling portion 34 is guided by the guide regulating face 66 of the extension portion 65. Moreover, as the airbag 20 completes its extension and expansion, the movement of the backward pulling portion 34 in the vicinity of the base portion 34a toward the interior side I is restrained by the guide regulating face 66 of the head rest 64.

At this time, like the first embodiment, the airbag 20 is mounted at the leading end 32b of the forward pulling portion 32 on the front side pillar portion FP of the front side of the side window SW. Moreover, the leading end 34b of the backward pulling portion 34 is mounted at a position of the rear wall portion 12 removed from the vehicle side face VS. Further, the backward pulling portion 34 of the airbag 20 is bent toward the interior side I by the guide regulating face 66 as it extends from the vicinity of the base portion 34a to the leading end 34b. In the airbag 20 of the embodiment, however, the backward pulling portion 34 is not loosened because the backward pulling portion 34 is regulated from moving toward the interior side I by the guide regulating face 66.

As a result, upon completion of the extension and expansion of the airbag 20 of the fourth embodiment, too, the longitudinal tension can be developed in the body portion 21 without any trouble. Therefore, the airbag device M4 of the fourth embodiment can also exhibit actions and effects similar to those of the airbag device M1 of the first embodiment.

In the fourth embodiment, too, the guide means 41 is constructed like the third embodiment by utilizing the seat SE mounted on the vehicle V1. Therefore, it is possible to minimize the increase in the number of components and in the number of assembling steps of the head protecting airbag device M4.

Moreover, the fourth embodiment employs the airbag 20 like the first embodiment. Therefore, the fourth embodiment can acquire actions and effects similar to those of the first embodiment when the airbag 20 extends and expands.

Here, the airbag devices M1 to M4 of the embodiments have the constructions in which the forward pulling portion 32 of the airbag 20 or 20A is formed separately of but jointed to the body portion 21 by means of eyelet. It is natural that the forward pulling portion 32 may be formed integrally with the body portion 21. In this modification, the forward pulling portion 32 may be hollow-woven integrally with the body portion 21. Moreover, the shape of the forward pulling portion 32 should not be limited to the belt shape of each embodiment but may be a triangular one narrowed toward the leading end 32b, as in the backward pulling portion 34.

On the other hand, the backward pulling portion 34 may be made separate of the body portion 21 but jointed to the same by sewing or melting it or by using eyelets. Moreover, the backward pulling portion 34 should not be limited to the triangular shape in each embodiment but may be formed into a belt shape leaving the lower edge 34d side as in the forward pulling portion 32.

Moreover, each embodiment has been described for the case in which the guide regulating portion 42 with the guide fixture 45 or the belt 49 as the guide means 41 is exposed to the interior side I of the rear pillar portion RP. However, the guide means 41 such as the guide fixture 45 or the belt 49 may be covered with the garnish 9 of the rear pillar portion RP or the garnish arranged at the corner portion C where the rear wall portion 12 and the vehicle side face VS intersect, if it can then still guide and regulate the position of the backward pulling portion 34 in the vicinity of the base portion 34a.

Moreover, the joint portions 43 of the guide fixture 45 or the belt 49 may be jointed not only to the inner panel 3 along the side window SW on the body 1 side but also to the rear wall portion 12 on the body 1 side or the roof on the body 1 side.

Here will be described head protecting airbag devices M5 and M6 which can achieve the second object of the invention.

Figure 16:
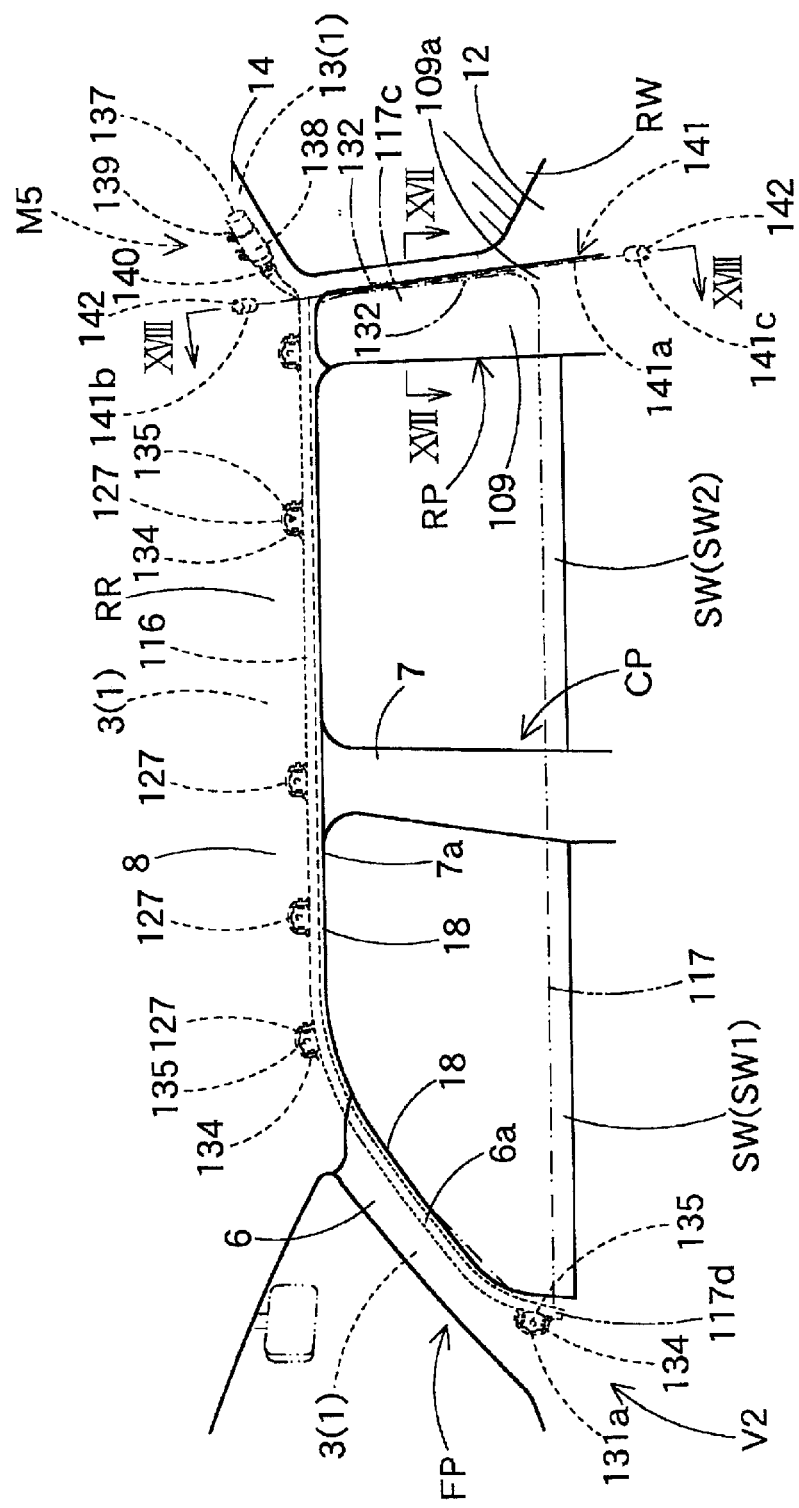
FIG. 16 is a schematic front elevation showing a head protecting airbag device of a fifth embodiment in use, seen from the vehicle interior side.

The head protecting airbag device M5 of a fifth embodiment, as shown in FIG. 16, is mounted like the foregoing airbag device M3, on the double-cab vehicle V2. The air bag device M5 comprises an airbag 116, an inflator 137, a guide member (or guide means) 141 and an airbag cover 18. In the airbag device M5, moreover, the interior side of the rear pillar portion RP is covered with a rear pillar garnish 109. The double-cab vehicle V2 is similar in its members other than the rear pillar garnish 109 to the double-cab vehicle V2 having the airbag device M3 of the third embodiment mounted thereon. The common members and portions will be omitted from description here, designating them by the same reference numerals as those of the third embodiment.

Figure 19:
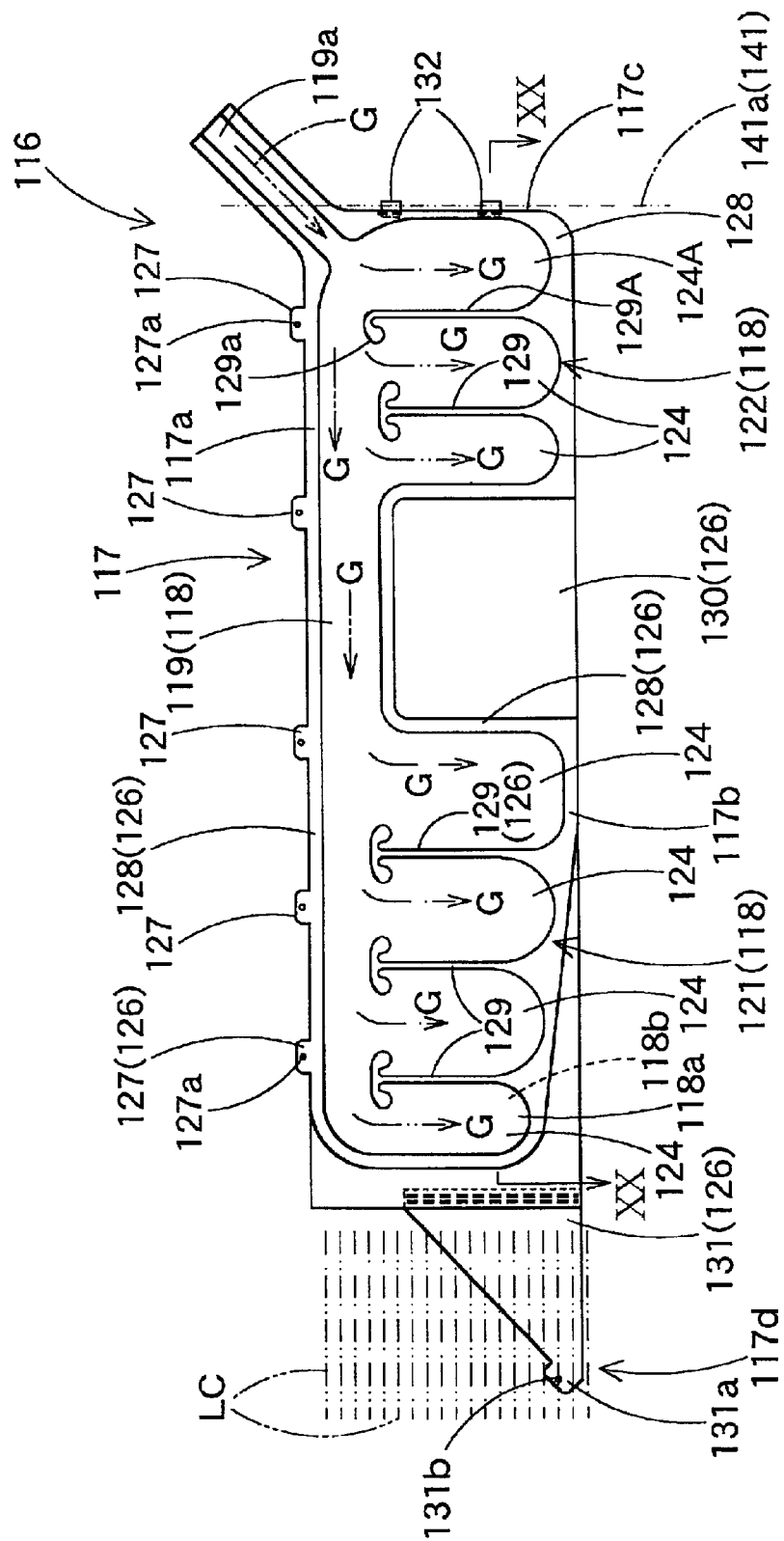
FIG. 19 is a flatly extended front elevation showing the airbag of the fifth embodiment.
Figure 20:
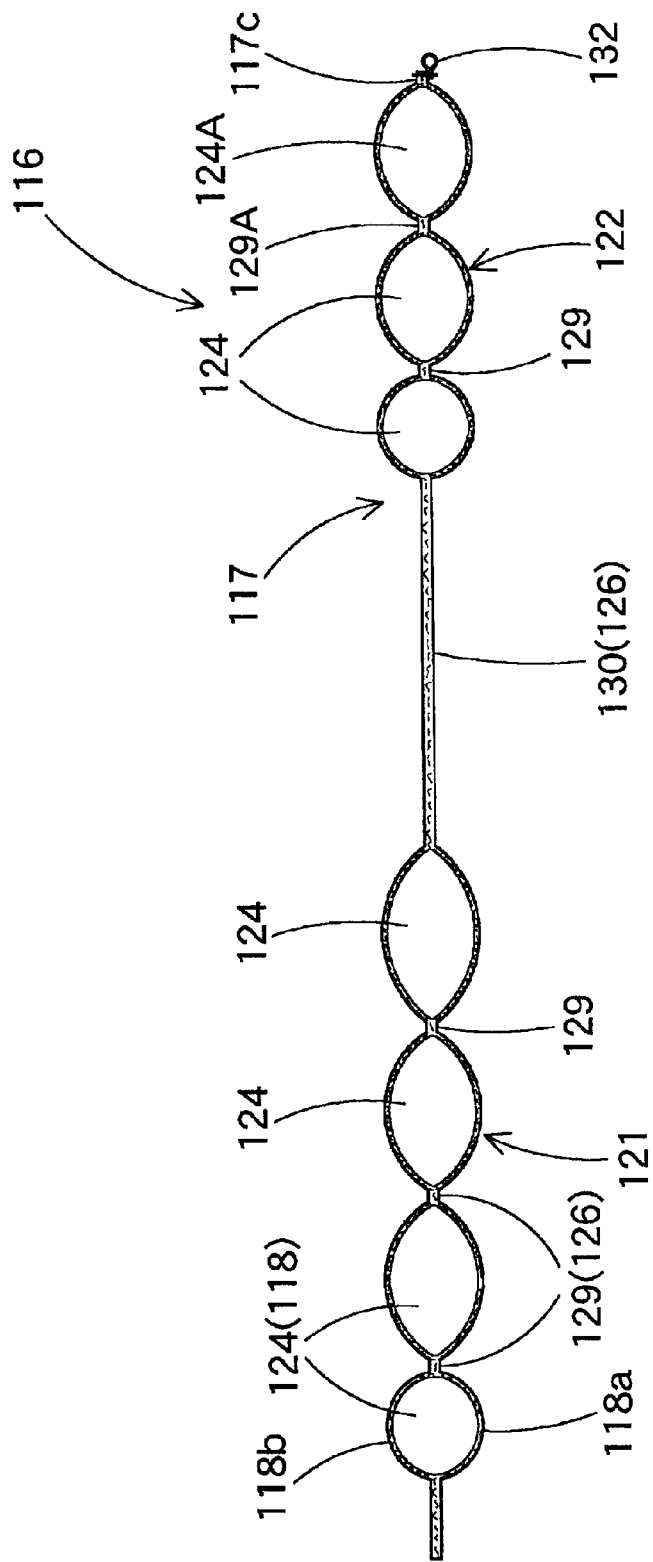
FIG. 20 is a lateral section showing a portion of the airbag of the fifth embodiment at an expanding time and corresponding to a portion XX—XX of FIG. 19.

As shown in FIG. 16, the airbag 116 is folded and housed along the upper edge of the side window SW (or SW1 and SW2) straddling the center pillar portion CP on the interior side. As shown in FIGS. 16, 19 and 20, moreover, the airbag 116 is provided with an airbag body 117, and ring portions 132 arranged on the rear edge 117c of the airbag body 117. This airbag body 117 can cover the interior sides of the side windows SW1 and SW2, the center pillar portion CP and the rear pillar portion RP. The ring portions 132 are arranged in plurality (or two in the embodiment) as guide-engaging portions to engage with the guide member 141.

The airbag body 117 is formed excepting the later-described extension portion 131 by hollow-weaving polyamide yarns or polyester yarns. Moreover, the airbag body 117 comprises a gas inlet portion 118 for expanding by admitting the inflating gas G from the inflator 137, and a non-inlet portion 126 admitting no inflating gas G. The gas inlet portion 118 expands to separate the interior side wall portion 118a and the exterior side wall portion 118b from each other. Here, the extension portion 131 is sewn to the front edge of the later-described peripheral edge joint portion 128.

In the case of the embodiment, the gas inlet portion 118 comprises front/rear seat inlet portions 121 and 122, and an inlet expansion portion 119. This inlet expansion portion 119 guides the inflating gas G discharged from the inflator 137, into the front/rear seat inlet portions 121 and 122. The front seat inlet portion 121 covers the interior side of the side window SW1 on the side of the front seat SE1 when the airbag is extending and expanding. The rear seat inlet portion 122 covers the interior side of the side window SW2 on the side of the rear seat SE2. In the individual front/rear seat inlet portions 121 and 122, there are arranged a plurality of vertical expansion portions 124 which expand in vertical rod shapes when they admit the inflating gas. These vertical expansion portions 124 are constructed by partitioning the areas of the individual front/rear seat inlet portions 121 and 122 by the later-described partitioning joint portions (or the thickness regulating portions) 129. Moreover, the vertical expansion portion 124 arranged on the rear end side in the rear seat inlet portion 122 is an initial vertical expansion portion 124A. The initial vertical expansion portion 124A expands along the guide member 141 at the initial inlet of the inflating gas G to move each ring portion 132 downward along the guide member 141. In other words, the initial vertical expansion portion 124A is arranged on the rear edge 117c near the inflator 137, on the upstream side of the inlet of the inflating gas G.

The inlet expansion portion 119 is so positioned on the upper edge 117a side of the airbag body 117 as to communicate with the upper ends of the individual vertical expansion portions 124 in the front/rear seat inlet portions 121 and 122. Moreover, the inlet expansion portion 119 is arranged to extend longitudinally. The rear end of the inlet expansion portion 119 is cylindrically protruded obliquely upward from the rear edge side of the airbag body 117 to form an inlet port 119a to be connected to the inflator 137.

The non-inlet portion 126 is constructed to join the interior side wall portion 118a and the exterior side wall portion 118b. The non-inlet portion 126 comprises mounting portions 127, the peripheral edge joint portion 128, the partitioning joint portions 129, a panel portion 130 and the extension portion 131.

The peripheral edge joint portion 128 is arranged around the gas inlet portion 118 and at portions including the periphery of the panel portion 130 and contacting with the gas inlet portion 118. Moreover, the peripheral edge joint portion 128 is so thickly woven as to prevent gas leakage. The mounting portions 127 are so arranged in plurality as to protrude upward from the peripheral edge joint portion 128 on the upper edge 117a side of the airbag body 117. To the individual mounting portions 127, there are fixed mounting brackets 134 for mounting the mounting portions 127 on the inner panel 3. In the individual mounting portions 127, moreover, there are formed mounting holes 127a for inserting mounting bolts 135. Moreover, the individual mounting portions 127 are fixed together with the mounting brackets 134 on the inner panel 3 on the body 1 side by using the mounting bolts 135.

The partitioning joint portions 129 are so arranged in plurality as to extend upward in the areas of the front/rear seat inlet portions 121 and 122 from the lower edge of the peripheral edge joint portion 128 to the inlet expansion portion 119. The partitioning joint portions 129 are arranged to partition the front/rear seat inlet portions 121 and 122 into a plurality of vertical expansion portions 124 and to make their thicknesses substantially equal. Specifically, a partitioning joint portion 129A, arranged adjacent to the front side of the initial vertical expansion portion 124A, has an upper end 129a arranged higher than the upper ends of the remaining partitioning joint portions 129, as shown in FIG. 19. This arrangement is made so that the inflating gas G discharged from the inflator 137 may easily flow into the initial vertical expansion portion 124A.

The panel portion 130 and the extension portion 131 are arranged to retain the entire shape of the airbag body 117 and to reduce the capacity of the gas inlet portion 118 thereby to shorten the time period till the completion of the extension and expansion. The panel portion 130 is formed into a generally rectangular shape. The panel portion 130 is arranged below the inlet expansion portion 119 between the front seat inlet portion 121 and the rear seat inlet portion 122. Moreover, the peripheral edge joint portions 128 are arranged between the gas inlet portions 118 (i.e., the front/rear seat inlet portions 121 and 122 and the inlet expansion portion 119) around the panel portion 130.

The extension portion 131 is formed into a generally triangular shape extending forward from the front end of the front seat inlet portion 121. The extension portion 131 is mounted and fixed at its leading end 131a on the inner panel 3 by the lower portion of the front pillar portion FP on the body 1 side. In other word, this extension portion 131 is a portion for fixing the front end 117d, one longitudinal end of the airbag body 117, on the front pillar portion FP serving as one vertical edge of the side window SW1, arranged generally vertically. The leading end 131a of the extension portion 131 is provided with a mounting hole 131b for inserting the mounting bolt 135. The leading end 131a of the extension portion 131 fixes the mounting bracket 134 and is fixed on the inner panel 3 of the lower portion of the front pillar portion FP by utilizing the mounting bolt 135. Here in the embodiment, the extension portion 131 is formed of a woven fabric separate from the airbag body 117 and made from polyamide yarns or the polyester yarns and is sewn to the front edge side of the peripheral edge joint portion 128. The extension portion 131 may be hollow-woven integrally with the airbag body 117.

Each ring portion 132 serves as a guide-engaging portion which engages with the guide member 141 so that it is guided by the guide member 141 when the airbag 116 extends and expands. In the case of the embodiment, the ring portion 132 is formed of a woven fabric separate from the airbag body 117 and made from polyamide yarns or polyester yarns into a cylindrical shape. The ring portion 132 is sewn to the rear edge of the peripheral edge joint portion 128. The individual ring portions 132 are arranged to protrude backward from two portions of the vertical edge. Moreover, each ring portion 132 is so vertically opened that it can fit on the later-described body portion 141a of the guide member 141.

The inflator 137 is formed into a generally cylindrical shape, as shown in FIG. 16. The inflator 137 fits in the inlet port 119a at the inlet expansion portion 119 of the airbag body 117 and is connected to the airbag body 117 by utilizing a clamp 140. Moreover, the inflator 137 is mounted and fixed on the rear panel 13 arranged on the upper edge side of the rear window RW of the rear wall portion 12 on the body 1 side, by utilizing a mounting bracket 138 and a mounting bolt 139. Moreover, the inflator 137 is covered on the interior side with the lower edge 8a of the roof head lining 8.

Figure 17:
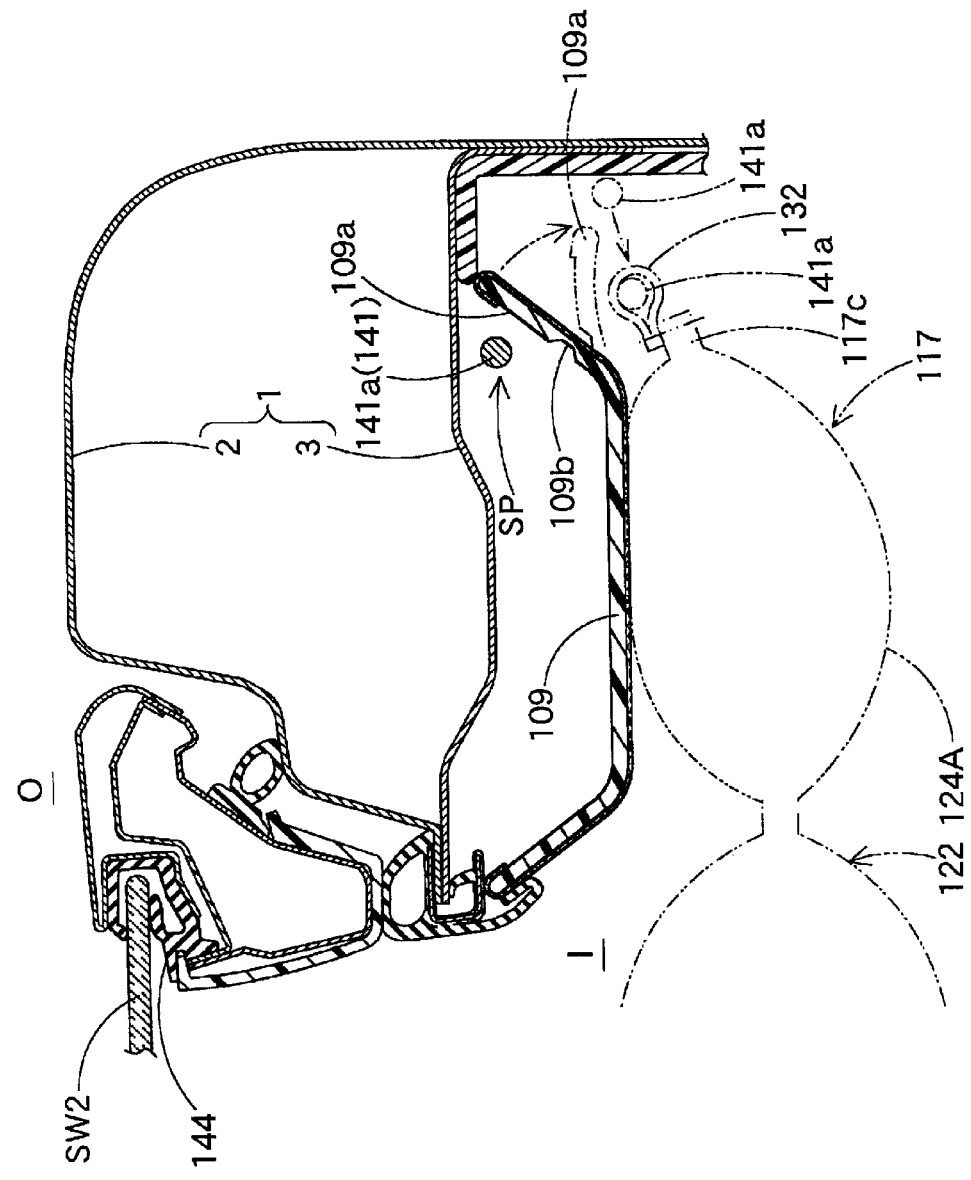
FIG. 17 is an enlarged schematic lateral section of a portion XVII—XVII of FIG. 16.
Figure 18:
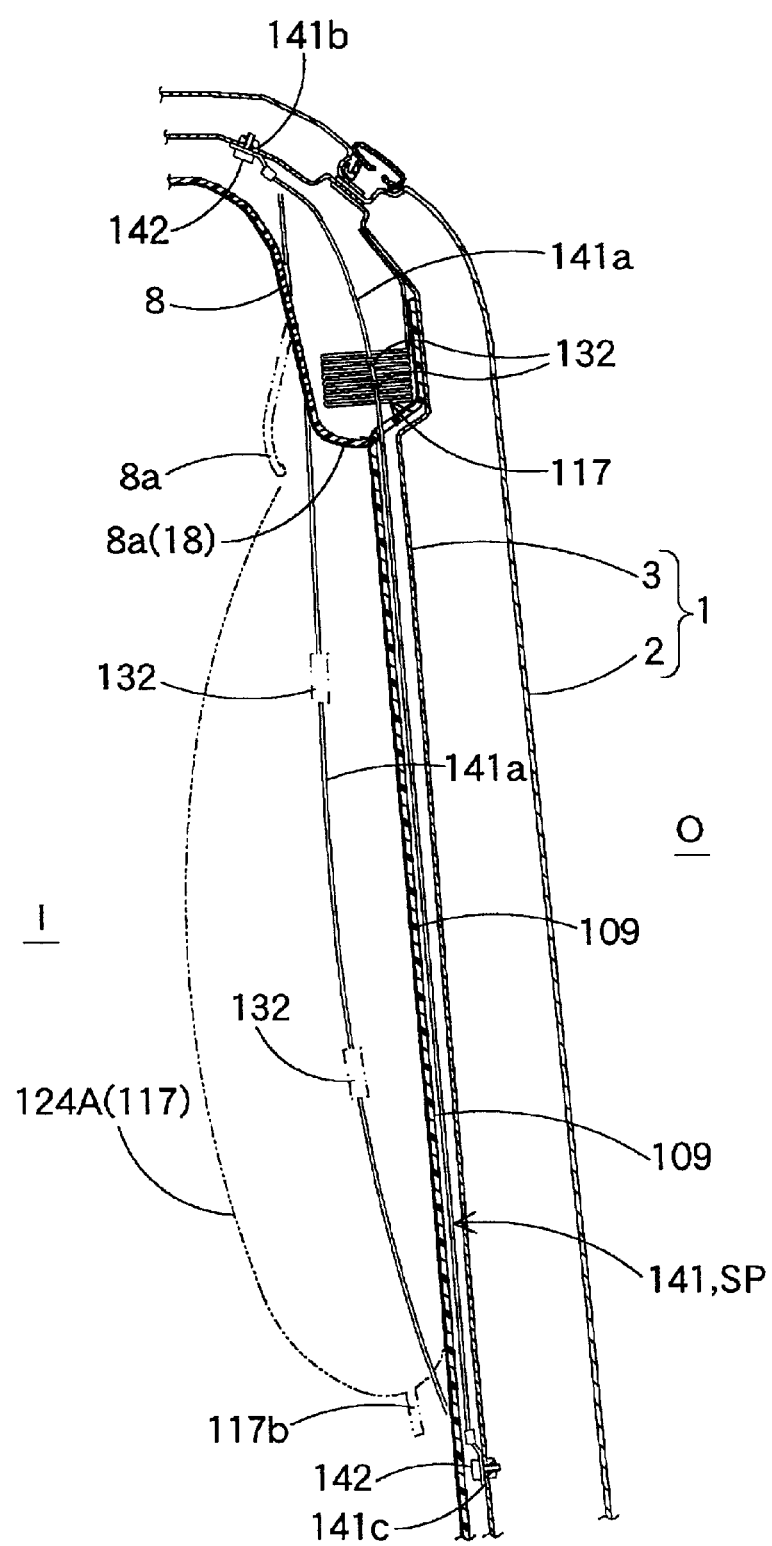
FIG. 18 is an enlarged schematic vertical section of a portion XVIII—XVIII of FIG. 16.

The guide member 141 as the guide means is made of a metallic wire having flexibility. The guide member 141 is arranged on the rear end side of the rear pillar portion RP, as shown in FIGS. 17 and 18. Moreover, the guide member 141 is covered on the interior side I with an edge portion 109a of the rear pillar garnish 109 vertically extended. The edge portion 109a becomes the portion which is positioned on the rear edge 117c side of the airbag 116 after extension and expansion. The guide member 141 is provided with the body portion 141a, and mounting portions 141b and 141c arranged at the upper end and the lower end of the body portion 141a. This body portion 141a is engaged with the ring portions 132 one above the other so that the ring portions 132 can move downward. Moreover, the guide member 141 is fixed by fastening the mounting portions 141b and 141c on the inner panel 3 on the body 1 side by means of bolts 142. Still moreover, the guide member 141 is constructed such that its body portion 141a protrudes from a housed position SP into the interior side I, being pulled and deflected into the interior side I by the downward moving ring portions 132, as indicated by double-dotted lines in FIGS. 17 and 18.

In the case of the embodiment, the upper side mounting portions 141b are fixed on the upper side inner panel 3 of the airbag 116 to be folded and housed. On the other hand, the lower side mounting portions 141c are fixed on the inner panel 3 in the vicinity of the lower edge 117b of the airbag 116 when it has completed extension and expansion.

In the vicinity of the front side of the edge 109a of the rear pillar garnish 109, as shown in FIG. 17, there is formed a hinge 109b. Therefore, the edge portion 109a can be pushed and opened to the interior side I by the body portion 141a of the guide member 141 protruding to the interior side I when the airbag 116 extends and expands. Here, a member 144 in FIG. 17 is a glass run. Moreover, the body portion 141a is set to have a length allowing it to protrude to the interior side I, when swelled upon substantial completion of the expansion of the airbag 116. Further, the airbag body 117 is restrained on the rear end 117c side from moving forward after substantial completion of the expansion, held by the body portion 141a of the guide member 141.

Here will be described how to mount this airbag device M5 of the fifth embodiment on the vehicle V2. Like the aforementioned airbag 10 of the first embodiment, the airbag 116 is folded along a number of longitudinal creases LC (as referred to double-dotted lines in FIG. 19), and the airbag 116 thus folded is suitably wrapped at its predetermined location with a not-shown breakable tape member retaining the folded condition.

After this, the mounting brackets 134 are fixed on the individual mounting portions 127 and the leading end 131a of the extension portion 131. Then, the airbag assembly is made by mounting the mounting brackets 138 on the inflator 137 and by assembling the inflator 137 with the airbag 116.

After this, the individual mounting portions 127 and the leading end 131a of the extension portion 131 are mounted and fixed on the inner panel 3 by employing the mounting bolts 135. The airbag assembly can be mounted on the body 1 of the vehicle V2 by mounting and fixing the mounting brackets 138 on the rear panel 13 by means of the mounting bolts 139.

Then, the guide member 141 is fixed on the body 1 of the vehicle V2 by inserting the body portion 141a into the individual ring portions 132 and by mounting the mounting portions 141b and 141c on predetermined positions of the inner panel 3 to be arranged on the rear pillar portion RP, by means of bolts 142.

Next, the not-shown lead wires extending from the inflator 137 are connected with a predetermined airbag operating circuit. As in the aforementioned first embodiment, the individual pillar garnishes 6, 7 and 109 are then mounted and fixed on the inner panel 3 of the individual pillar portions FP, CP and RP. In the roof side rail portion RR, the roof head lining 8 is mounted and fixed on the inner panel 3. Then, the airbag device M5 can be mounted on the vehicle V2.

Figure 21:
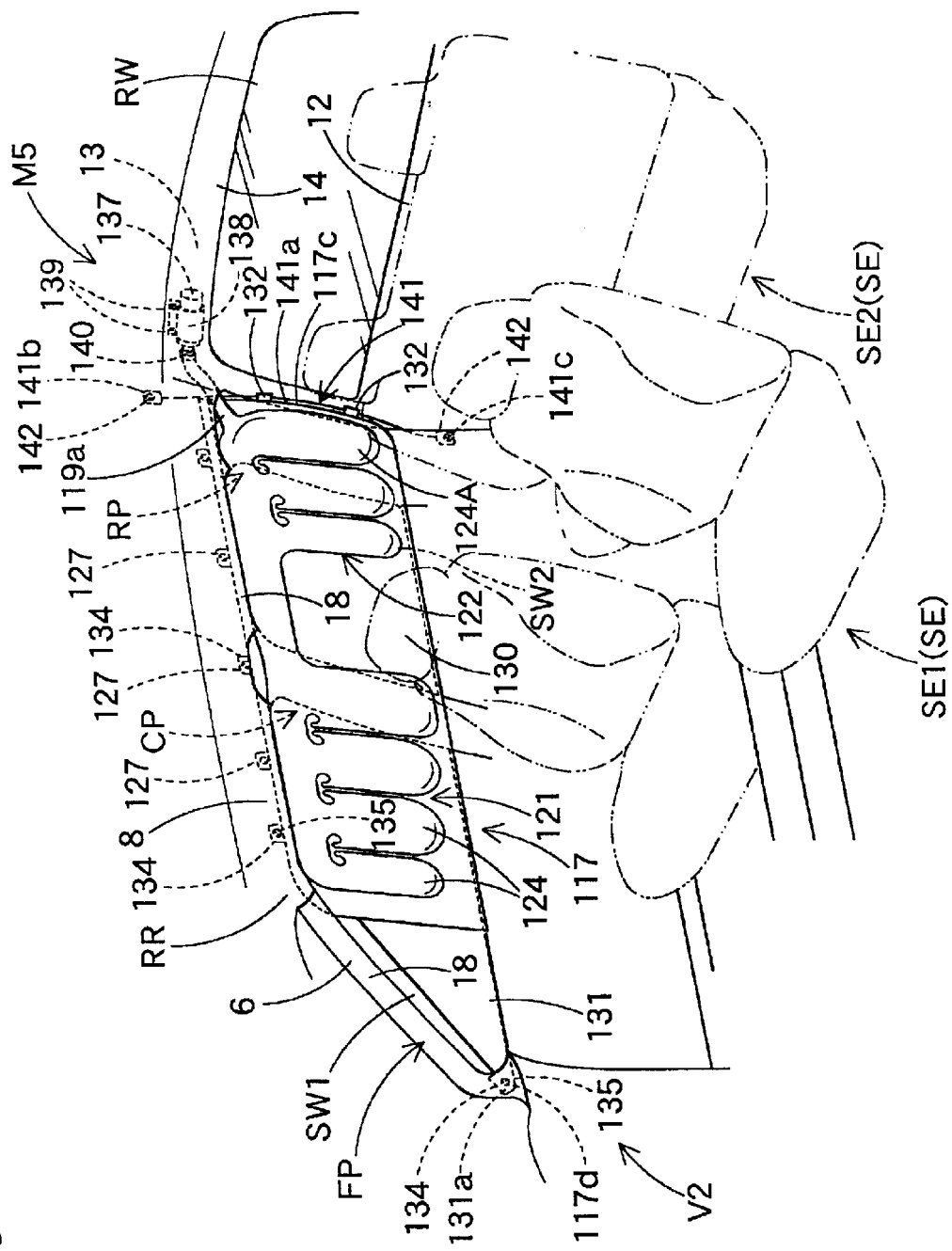
FIG. 21 is a perspective view showing the head protecting airbag device of the fifth embodiment in operation, seen from the vehicle interior side.

If the inflator 137 is then activated, the inflating gas G flows from the inlet port 119a into the inlet expansion portion 119 to break the not-shown tape member. Then, the inflating gas G flows into the front/rear seat inlet portions 121 and 122 to push and open the lower edges 6a and 8a of the front pillar garnish 6 and the roof head lining 8 which serve as the airbag cover 18. After this, the airbag 116 extends and expands to cover the interior sides of the side windows SW1 and SW2, the center pillar portion CP and the rear pillar portion RP, as indicated by double-dotted lines in FIG. 16 and in FIG. 21. With the airbag 116 having completed the expansion, the front end 117d is fixed on the inner panel 3 arranged at a portion of the front pillar portion FP. Moreover, the rear end 117c of the airbag is held and restrained from moving forward by the body portion 141a of the guide member 141 arranged at a portion of the rear pillar portion RP.

At this time of the airbag device M5 of the fifth embodiment, when the inflating gas G from the inflator 137 flows into the airbag 116, the initial vertical expansion portion 124A expands at first. As this initial vertical expansion portion 124A expands, the ring portions 132 as the guide-engaging portions are guided to move downward by the body portion 141a of the guide member 141 so that they are arranged at the expansion completion positions of the predetermined airbag 116. Before the inflating gas G flows into the remaining vertical expansion portions 124 of the airbag 116 to establish a tension on the lower edge side of the airbag 116, more specifically, the ring portions 132 are guided in advance by the body portions 141a of the guide member 141 so that the extension of the airbag 116 is brought into a substantially completion. Therefore, the airbag 116 can complete the extension and expansion without any trouble so that it can develop the longitudinal tension on the lower edge 117b side.

In the airbag device M5 of the embodiment, therefore, the airbag 116 can be smoothly guided by the guide member 141 to complete the extension, even if the airbag 116 is constructed so that the longitudinal tension may be developed on the lower edge 117b side upon completion of the extension and expansion.

In the airbag device M5 of the embodiment, moreover, when the airbag 116 is not extended, the guide member 141 is covered on the interior side I with the edge portion 109a of the rear pillar garnish 109. Therefore, the decorative design of the vehicle V2 having the guide member 141 mounted thereon is improved. At the extension and expansion of the airbag 116, moreover, the edge portion 109a covering the interior side I of the guide member 141 is opened to the interior side I so that it has no possibility of obstructing the extension and expansion of the airbag 116. Without taking this point into consideration, the guide member 141 is not covered on its interior side with the interior finish but may be exposed to the interior side. Moreover, the interior finish covering the interior side I of the guide member 141 should not be limited to the pillar garnish 109, but the guide member 141 may be covered on its interior side I with a trim or the like.

In the airbag device M5 of the embodiment, moreover, the guide member 141 is made of a flexible material. When the airbag is extending and expanding 116, the guide member 141 opens the edge portion 109a of the rear pillar garnish 109 and protrudes from the housed position SP to the interior side I. Therefore, the airbag 116 can extend and expand smoothly without having its guide-engaging portions (or ring portions) 132 interfering with the rear pillar garnish 109. Without taking this point into consideration, the guide member may be made of a rigid rod or the like.

In the airbag device M5 of the embodiment, still moreover, the airbag 116 has the plurality of vertical expansion portions 124 and 124A arranged in the longitudinal directions. These vertical expansion portions 124 and 124A expand to shorten the longitudinal length by accepting the inflating gas. Therefore, the longitudinal tension can be highly developed on the lower edge 117b side of the airbag 116 having completed the expansion. When the airbag 116 has substantially completed the expansion, moreover, the body portion 141a of the guide member 141 is slightly deflected forward of the vehicle, as indicated by double-dotted lines in FIG. 17, in accordance with the longitudinal shrinkage of each vertical expansion portion 124.

In the airbag device M5 of the embodiment, still moreover, the initial vertical expansion portion 124A of the airbag 116 is so arranged on the rear end 117c side near the inflator 137 that it may be on the upstream side of the inflating gas G. When the airbag is extending and expanding 116, therefore, the inflating gas G discharged from the inflator 137 can be promptly spurted into the initial vertical expansion portion 124A. In other words, the initial vertical expansion portion 124A can be expanded more quickly than the remaining vertical expansion portions 124 of the airbag 116. As a result, the ring portions 132 can quickly move downward while being guided by the guide members 141 thereby to allow the airbag 116 to expand quickly.

Figure 22:
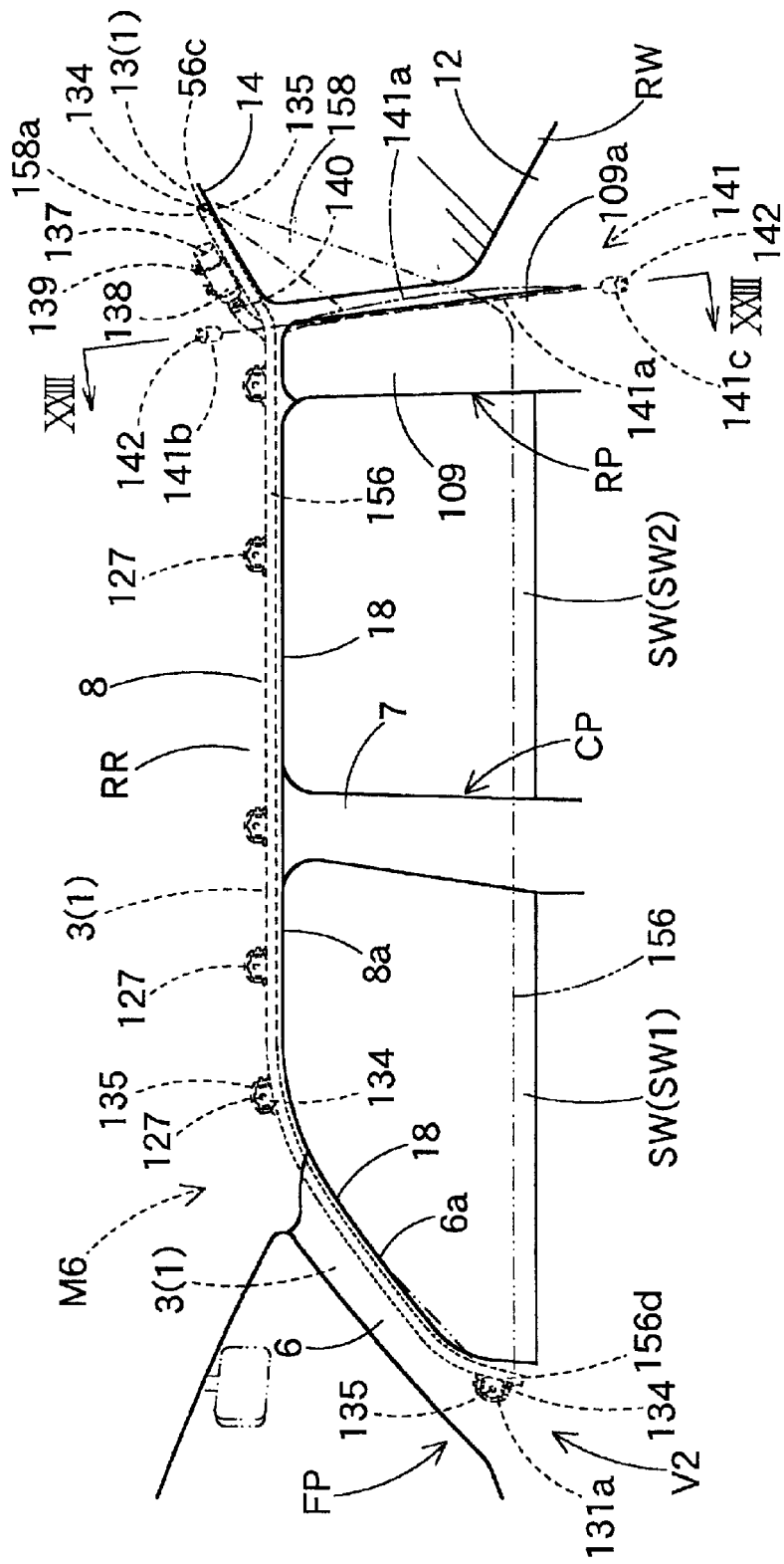
FIG. 22 is a perspective view showing a head protecting airbag device of a second embodiment in use, seen from the vehicle interior side.
Figure 25:
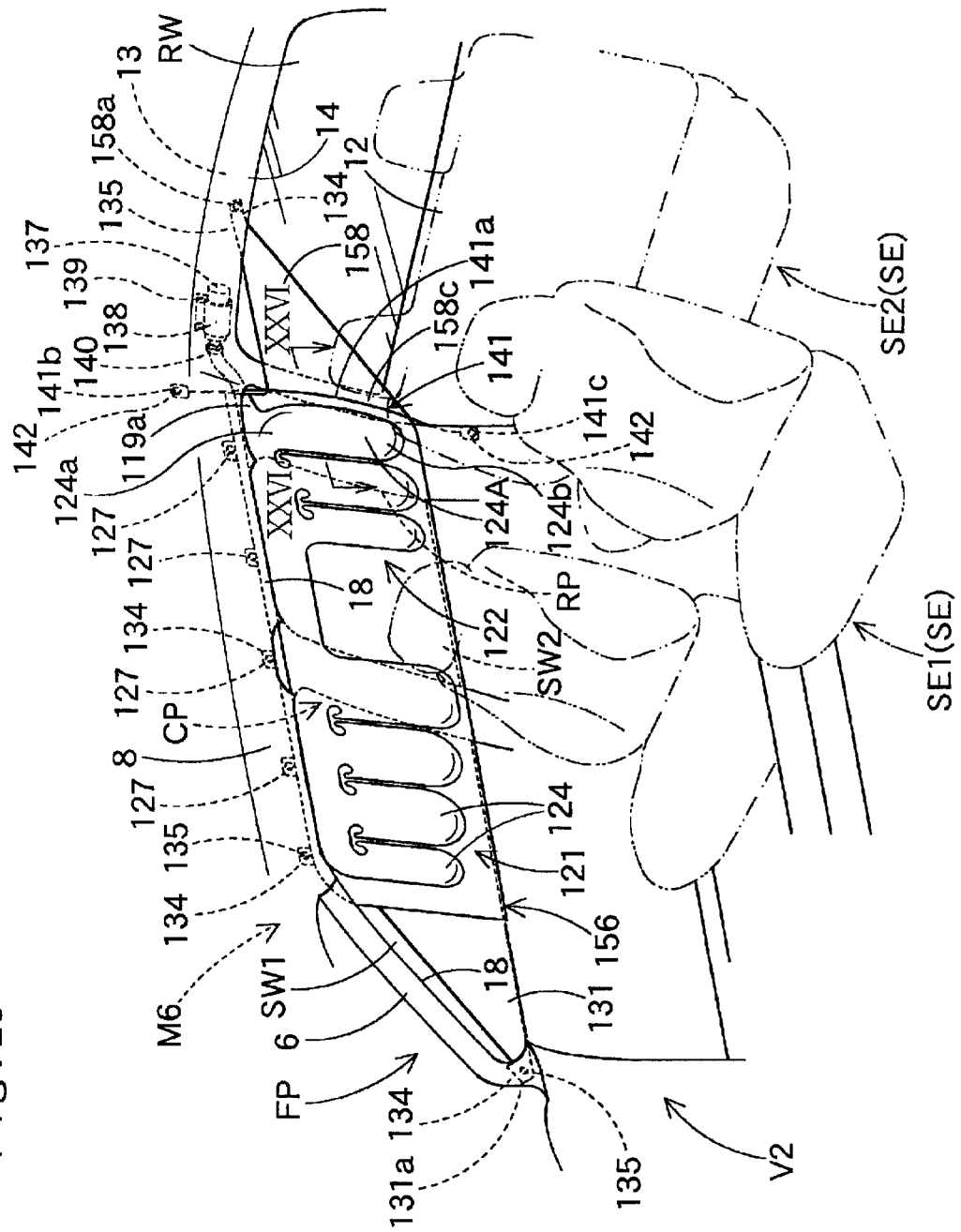
FIG. 25 is a perspective view showing the head protecting airbag device of the sixth embodiment in operation, seen from the vehicle interior side.

Here will be described an airbag device M6 according to a sixth embodiment of the invention. This airbag device M6 has a construction similar to that of the aforementioned airbag device M5 of the fifth embodiment excepting the shape of an airbag 156, as shown in FIGS. 22 and 25. Therefore, the common members and portions will be omitted on their description by designating them by the same reference numerals as those of the fifth embodiment.

The airbag 156 employed in the airbag device M6 of the sixth embodiment has a construction similar to the aforementioned airbag 116 of the fifth embodiment excepting that an extension portion 158 is arranged to protrude backward from the rear end side of the rear seat inlet portion 122. Therefore, the common members and portions in the airbag 156 will be omitted on their description by designating them by the same reference numerals as those of the airbag 116 of the fifth embodiment.

The extension portion 158 is formed into a generally triangular shape extending backward from the rear end side of the rear seat inlet portion 122. Moreover, the extension portion 158 is formed to extend linearly from the vicinity of the lower end 124b of the initial vertical expansion portion 124A. And, the extension portion 158 is mounted and fixed at its leading end 158a on the rear panel 13 of the upper side of the rear window RW on the body 1 side. The leading end 158a of the extension portion 158 is provided with a mounting hole 158b for inserting the mounting bolt therethrough. The leading end 158a is fixed on the rear panel 13 on the upper side of the rear window RW by fixing the mounting bracket 134 thereon and by utilizing the mounting bolt 135.

In the airbag device M6 of the sixth embodiment, a portion 158c of the extension portion 158 in the vicinity of the initial vertical expansion portion 124A provides an guide-engaging portion to engage with the body portion 141a of the guide member 141. This guide-engaging portion is guided by the body portion 141a when the airbag 156 extends and expands. In other words, the sixth embodiment is constructed such that the body portion 141a of the guide member 141 is arranged on the interior side I of the extension portion 158. When the airbag is extending and expanding 156, moreover, the portion 158c near the initial vertical expansion portion 124A moves downward along the body portion 141a as the initial vertical expansion portion 124A expands.

Figure 26:
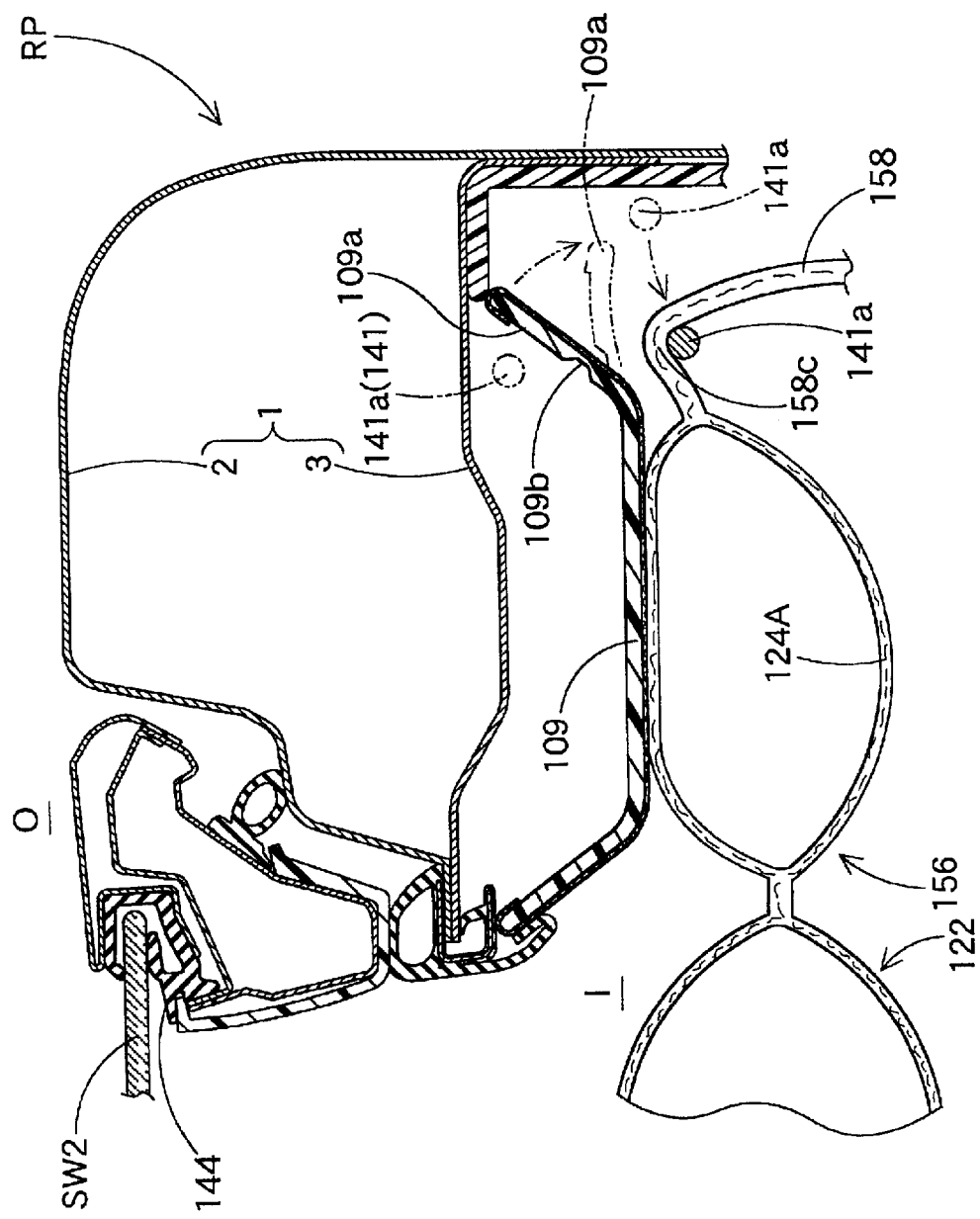
FIG. 26 is an enlarged schematic lateral section of a portion XXVI—XXVI of FIG. 25.

The airbag 156 in the airbag device M6 of the sixth embodiment is fixed on its front end 156d side on the inner panel 3 which is arranged at a portion of the front pillar portion FP, when it completes the expansion substantially. On the other hand, a rear end 156c is fixed on the rear panel 13 which is arranged above the rear window RW. When the airbag 156 completes the expansion substantially, the body portion 141a of the guide member 141 is arranged on the interior side I of the guide-engaging portion 158c near the rear end of the initial vertical expansion portion 124A, and the guide-engaging portion 158c is held on the body portion 141a while being regulated from moving forward. On the lower edge 156b side of the airbag 156 having completed the expansion substantially, therefore, the tension is developed longitudinally of the vehicle V2 from the front end 156d side to the guide member 141. When the airbag 156 completes the expansion substantially, the body portion 141a of the guide member 141 is slightly deflected forward of the vehicle, as shown in FIG. 26, like the aforementioned fifth embodiment, as each vertical expansion portion 124 shrinks in the longitudinal directions.

Figure 23:
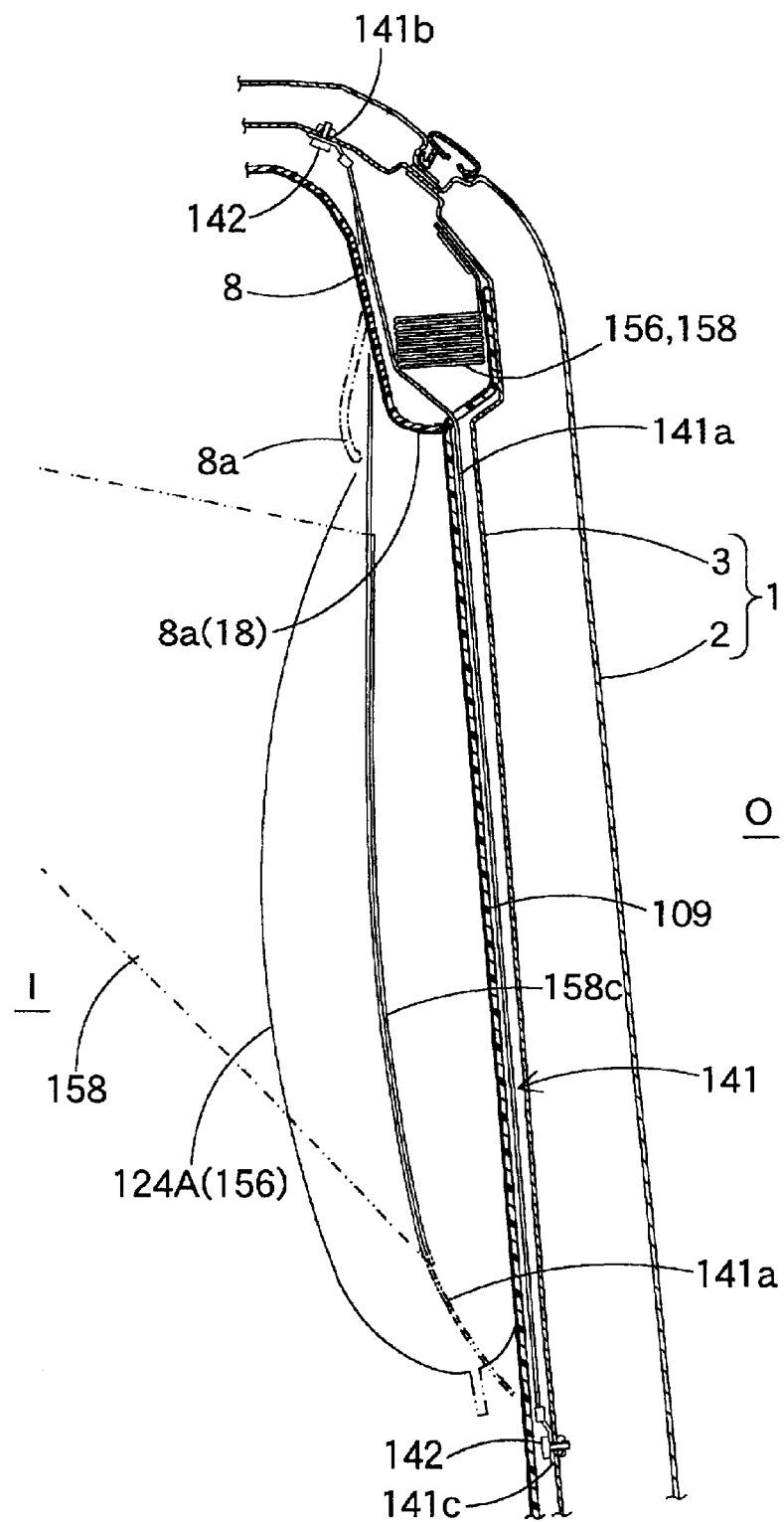
FIG. 23 is an enlarged schematic vertical section of a portion XXIII—XXIII of FIG. 22.
Figure 24:
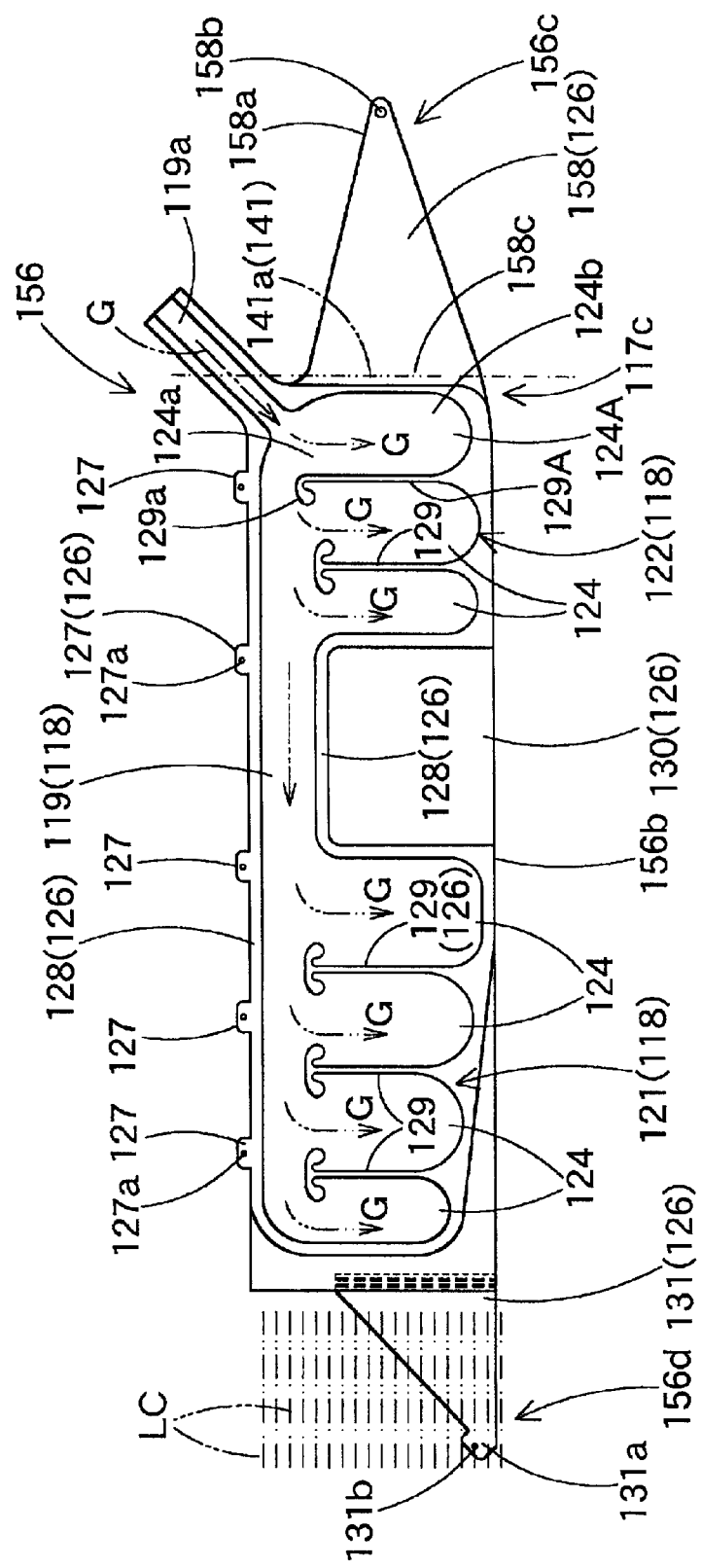
FIG. 24 is a flatly extended front elevation showing the airbag of the sixth embodiment.

The airbag 156 thus constructed can be folded like the airbag 116 of the fifth embodiment. When this folded airbag 156 is mounted on the vehicle V2 as in the fifth embodiment, moreover, the airbag device M6 can be mounted on the vehicle V2. Here, the guide member 141 is arranged on the interior side I of the airbag 156, as shown in FIG. 23.

In the airbag device M6 employing the airbag 156 thus constructed, too, when the inflating gas G from the inflator 137 flows into the airbag 156, the initial vertical expansion portion 124A expands first of all. In accordance with the expansion of the initial vertical expansion portion 124A, the portion 158c (or the guide-engaging portion) of the extension portion 158 arranged near the initial vertical expansion portion 124A moves downward while being guided by the body portion 141a of the guide member 141, so that it is arranged at a predetermined extension completion position of the airbag 156. Before the inflating gas G flows into the remaining vertical expansion portions 124 of the airbag 156 to develop the tension on the lower edge 156b side of the airbag 156, more specifically, the guide-engaging portion 158c is guided in advance by the body portion 141a of the guide member 141 thereby to complete the extension of the airbag 156 substantially. Therefore, the airbag 156 can complete its extension and expansion without any trouble, as shown in FIG. 25, to develop the longitudinal tension on the lower edge 156b side.

In the airbag device M6 of the sixth embodiment, moreover, there is arranged in the airbag 156 the extension portion 158 which extends linearly from the vicinity of the lower end 124b of the initial vertical expansion portion 124A. The upper end 158a of the extension portion 158 is mounted and fixed on the rear panel 13 on the upper side of the rear window RW on the side of the body 1. When the airbag is extending and expanding 156, therefore, the initial vertical expansion portion 124A exhibits a rigidity to some extent if the initial vertical expansion portion 124A is charged with the inflating gas G. Upon completion of the expansion of the airbag 156, moreover, the initial vertical expansion portion 124A is pulled on its lower end 124b side backward of the vehicle V2 by the lower edge of the extension portion 158 extending substantially linearly from the lower end 124b side of the initial vertical expansion portion 124A. In other words, this initial vertical expansion portion 124A turns the lower end 124b backward on an upper end 124a to develop a higher longitudinal tension on the lower edge 156b side of the airbag 156.

Moreover, the airbag device M6 of the sixth embodiment employs the guide member 141 having a construction similar to that of the fifth embodiment. Therefore, actions and effects similar to those of the fifth embodiment can be acquired when the airbag is extending and expanding 156.

Here in the fifth and sixth embodiments, the airbag devices M5 and M6 are mounted on the double-cab vehicle V2. However, the airbag devices M5 and M6 of the fifth and sixth embodiments may be mounted not only on the double-cab vehicle V2 but also on a single-cab vehicle or a sedan type vehicle.

In the fifth and sixth embodiments, moreover, the guide member 141 is arranged at the portion of the rear pillar portion RP, and the guide-engaging portions 132 and 158c are arranged on the sides of the rear ends 117c and 156c of the rear seat inlet portion 122 in the airbags 116 and 156.

However, the arranging positions of the guide member and the guide-engaging portions should not be limited thereto. For example, the guide member may be arranged at the portion of the center pillar portion CP, and the guide-engaging portions maybe arranged in the airbag between the front seat inlet portion and the rear seat inlet portion. In this modification, it is preferable that the guide member is covered on its interior side with the center pillar garnish which is provided with such a breakable portion as can be broken as the guide member protrudes when the airbag is extending and expanding.

In the foregoing first to sixth embodiments, moreover, the airbags 20, 20A, 116 and 156 are manufactured by the hollow weaving method. However, the airbag to be applied to the invention should not be limited to the tubularly woven one but may be prepared by folding a sheet of flat cloth and by sewing or adhering the predetermined portions such the overlapped peripheral edge of the cloth. In this modification, the forward and backward pulling portions 32 and 34, the extension portions 131 and 158 and the ring portions 132 may be connected to the body portion 21 and the airbag body 117 by utilizing an adhesive or mixing means using the eyelets or rivets.

What is claimed is:

1. A head protecting airbag device to be mounted on a vehicle including: a side window positioned on the side face of the vehicle, a rear wall portion arranged on the rear side of said side window; and a pillar portion arranged on the front side of said side window, wherein said rear wall portion is arranged to intersect said side window generally perpendicularly, and wherein said pillar portion is arranged to extend generally vertically, comprising:

an airbag folded and housed on the upper edge side of said side window on the interior side so that it can cover said side window when extending and expanding, wherein said airbag is mounted at its two longitudinal ends on the vehicle body so as to develop a longitudinal tension when the airbag is extending and expanding, wherein said airbag is mounted at its front side leading end on said pillar portion, and wherein said airbag is mounted at its rear side leading end at a position of said rear wall portion spaced from said vehicle side face; and guide means arranged near a corner portion between said rear wall portion and said vehicle side face so as to guide the downward protrusion of said airbag when the airbag is extending and expanding and to regulate the movement of said airbag at said corner portion to the interior side upon completion of the extension and expansion.

2. A head protecting airbag device according to claim 1, wherein said airbag includes at least one vertical expansion portion on the side window side when the airbag is extending and expanding for expanding vertically by admitting an inflating gas.

3. A head protecting airbag device according to claim 2, wherein said airbag upon completion of the expansion arranges said vertical expansion portion in the vicinity of and along said guide means, and wherein said airbag is so mounted on said rear wall portion as to extend generally linearly from the vicinity of the lower end of said vertical expansion portion.

4. A head protecting airbag device according to claim 1, wherein the portion of said airbag to be arranged on the exterior side of said guide means when the airbag is extending and expanding is constructed of a non-inlet portion for admitting no inflating gas.

5. A head protecting airbag device according to claim 1, wherein said guide means is formed of a guide fixture made of a long metal member and includes a guide regulating portion extending vertically and a joint portion to be jointed to said vehicle body, wherein said guide regulating portion can guide and regulate the movement of said airbag, and wherein said joint portion is arranged on at least one side of the upper and lower end sides of said guide regulating portion.

6. A head protecting airbag device according to claim 1, wherein said guide means is formed of a band-shaped belt having a flexibility and includes a guide regulating portion extending vertically and joint portions to be jointed to said vehicle body, wherein said guide regulating portion can guide and regulate the movement of said airbag, and wherein said joint portions are arranged on the upper and lower end sides of said guide regulating portion.

7. A head protecting airbag device according to claim 1, wherein said guide means is mounted on a passenger seating seat arranged on said vehicle body.

* * * * *